United States Patent
Hoffman et al.

(10) Patent No.: US 8,636,034 B2
(45) Date of Patent: Jan. 28, 2014

(54) OIL-LESS AND WETTED PRESSURE RELIEF VALVES HAVING AN INTEGRATED FILTER

(71) Applicant: Plitek, L.L.C., Des Plaines, IL (US)

(72) Inventors: Karl K. Hoffman, Arlington Heights, IL (US); Keith P. Hoffman, Rolling Meadows, IL (US); Robert C. Larsen, Bartlett, IL (US); John Ozcomert, Bartlett, IL (US); Douglas A. Wielunski, Bartlett, IL (US)

(73) Assignee: Plitek, L.L.C., Des Plaines, IL (US)

( * ) Notice: Subject to any disclaimer, the term of this patent is extended or adjusted under 35 U.S.C. 154(b) by 0 days.

(21) Appl. No.: 13/648,072

(22) Filed: Oct. 9, 2012

(65) Prior Publication Data

US 2013/0048125 A1 Feb. 28, 2013

Related U.S. Application Data

(63) Continuation-in-part of application No. 13/199,486, filed on Aug. 31, 2011.

(51) Int. Cl.
*F16K 15/14* (2006.01)
*B65D 33/01* (2006.01)

(52) U.S. Cl.
USPC ............ 137/844; 210/499; 137/550; 137/851

(58) Field of Classification Search
USPC .......... 137/246, 844, 859, 550, 851; 383/100; 210/498–499
See application file for complete search history.

(56) References Cited

U.S. PATENT DOCUMENTS

| | | | | |
|---|---|---|---|---|
| 2,927,722 A | * | 3/1960 | Metzger | ............ 383/94 |
| 3,595,467 A | | 7/1971 | Goglio | |
| 3,799,427 A | | 3/1974 | Goglio | |
| 4,000,846 A | | 1/1977 | Gilbert | |
| 4,122,993 A | | 10/1978 | Glas | |
| 4,134,535 A | | 1/1979 | Barthels et al. | |
| 4,206,870 A | | 6/1980 | DeVries | |

(Continued)

FOREIGN PATENT DOCUMENTS

| EP | 0024310 A1 | 7/1980 |
|---|---|---|
| EP | 1481911 A1 | 1/2004 |

(Continued)

OTHER PUBLICATIONS

Excerpt from PackTV Web TV Channel for Packaging. "Avery Dennison Launches Flexis Air Pre-Oiled Valve for Coffee Packs." <www.packtv.co.uk/2011/11/avery-dennison-launches-flexis-air-pre-oiled-valve-for-coffee . . . > 4 pages. Date: Copyright 2011.

(Continued)

*Primary Examiner* — John Rivell
*Assistant Examiner* — Angelisa Hicks
(74) *Attorney, Agent, or Firm* — Jansson Munger McKinley & Shape Ltd.

(57) ABSTRACT

A one-way pressure relief valve having an integrated filter. One-way pressure relief valves may be applied to a product package to evacuate gas from the package. The integrated filter prevents materials within the package from interfering with closure or operation of the pressure relief valve. Certain pressure relief valve embodiments can be configured for optimal valve operation without need for a wetting agent while other pressure relief valve embodiments operate optimally with a wetting agent.

25 Claims, 9 Drawing Sheets

(56) References Cited

U.S. PATENT DOCUMENTS

| | | | |
|---|---|---|---|
| 4,420,015 A | 12/1983 | Blaser | |
| 4,444,219 A | 4/1984 | Hollenstein | |
| 4,576,285 A | 3/1986 | Golio | |
| 4,653,661 A | 3/1987 | Buchner et al. | |
| 4,705,174 A | 11/1987 | Goglio | |
| 4,890,637 A | 1/1990 | Lamparter | |
| 4,971,218 A | 11/1990 | Buchner et al. | |
| 5,263,777 A | 11/1993 | Domke | |
| 5,326,176 A | 7/1994 | Domke | |
| 5,427,839 A | 6/1995 | Buchner et al. | |
| 5,445,870 A | 8/1995 | Buchner et al. | |
| 5,515,994 A | 5/1996 | Goglio | |
| 5,584,409 A | 12/1996 | Chemberlen | |
| 5,727,881 A | 3/1998 | Domke | |
| 5,782,266 A | 7/1998 | Domke | |
| 6,070,728 A | 6/2000 | Overby et al. | |
| 6,254,908 B1 | 7/2001 | Winters | |
| 6,468,332 B2 | 10/2002 | Goglio et al. | |
| 6,516,482 B2 | 2/2003 | Karafa et al. | |
| 6,662,827 B1 | 12/2003 | Clougherty et al. | |
| 6,663,284 B2 | 12/2003 | Buckingham et al. | |
| 7,074,443 B2 | 7/2006 | Thomas et al. | |
| 7,178,550 B2 | 2/2007 | Stotkiewitz et al. | |
| 7,178,555 B2 * | 2/2007 | Engel et al. | 137/852 |
| 7,243,683 B2 | 7/2007 | Stotkiewitz et al. | |
| 7,244,223 B2 | 7/2007 | Hartman et al. | |
| 7,328,543 B2 | 2/2008 | Hoffman et al. | |
| 7,399,263 B2 | 7/2008 | Hartman et al. | |
| 7,472,524 B2 | 1/2009 | Hoffman et al. | |
| 7,490,623 B2 | 2/2009 | Rypstra | |
| 7,611,557 B2 | 11/2009 | Hoffman | |
| 7,637,283 B2 * | 12/2009 | Hoffman | 137/843 |
| 7,922,026 B2 | 4/2011 | Westphal | |
| 7,967,509 B2 | 6/2011 | Turvey et al. | |
| 8,038,023 B2 | 10/2011 | Moore et al. | |
| 8,082,644 B2 | 12/2011 | Hoffman et al. | |
| 8,112,971 B2 | 2/2012 | Newrones et al. | |
| 8,177,700 B2 | 5/2012 | Newrones et al. | |
| 2004/0035783 A1 * | 2/2004 | Strohm et al. | 210/492 |
| 2004/0079419 A1 | 4/2004 | Taylor et al. | |
| 2009/0145841 A1 * | 6/2009 | Arai | 210/497.3 |
| 2009/0169693 A1 * | 7/2009 | Hoffman | 426/395 |
| 2011/0284536 A1 | 11/2011 | Walters | |
| 2012/0243807 A1 | 9/2012 | Pascoe | |
| 2012/0247346 A1 | 10/2012 | Hoffman et al. | |
| 2012/0281933 A1 | 11/2012 | Beer | |
| 2013/0048635 A1 | 2/2013 | Hoffman et al. | |

FOREIGN PATENT DOCUMENTS

| | | |
|---|---|---|
| EP | 1538107 A2 | 8/2005 |
| WO | WO8304081 A1 | 11/1983 |
| WO | WO2009142987 A1 | 11/2009 |
| WO | WO2010020453 A1 | 2/2010 |
| WO | WO2011091924 A1 | 8/2011 |

OTHER PUBLICATIONS

Robert Bosch GmbH. "CVA 2000/3000 V45 Valve Applicators for the "aromafin" V45 Exterior Aroma Protection Valves." 4 pages. Date: Undated.

Robert Bosch GmbH. "Bosch aroma protection valves." 16 pages. Date: Undated.

Plitek Asia Limited. "Pli-Valv Product Selection Guide." 1 page. Date: Apr. 2005.

Plitek, LLC. "PV-15 One-Way Degassing Valve Product Specification." 1 page. Date: Oct. 2007.

Plitek, LLC. "PV-28 One-Way Degassing Valve Product Specification." 1 page. Date: Oct. 2007.

Plitek, LLC. "PV-41 One-Way Degassing Valve Product Specification." 1 page. Date: Oct. 2007.

Plitek, LLC. "PVA-120 Valve Applicator Product Specification." 1 page. Date: Oct. 2007.

Plitek, LLC. "Pli-Valv Package Degassing System PV-28." <www.plitek.com/products/pv28.asp> 1 page. Date: Jan. 30, 2008.

Plitek, LLC. "Pli-Valv Package Degassing System PV-41." <www.plitek.com/products/pv41.asp> 1 page. Date: Jan. 30, 2008.

* cited by examiner

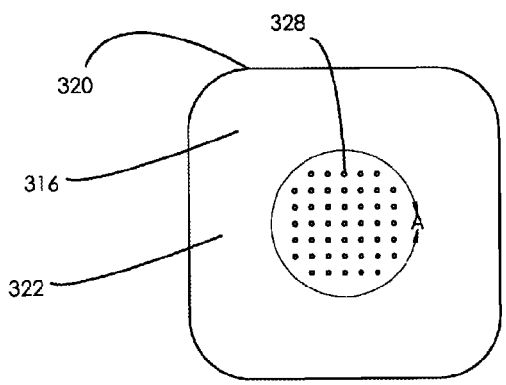 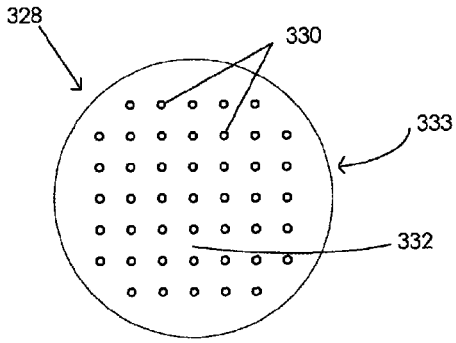
FIG. 6  FIG. 6A
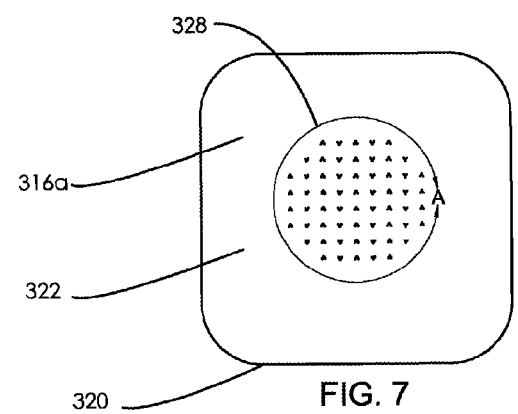 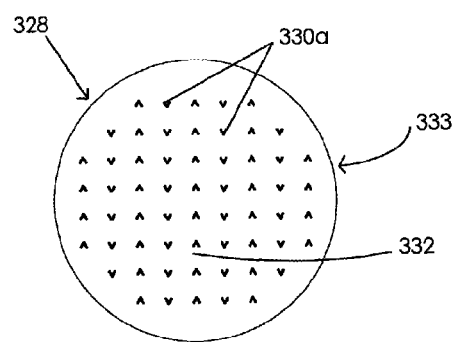
FIG. 7  FIG. 7A
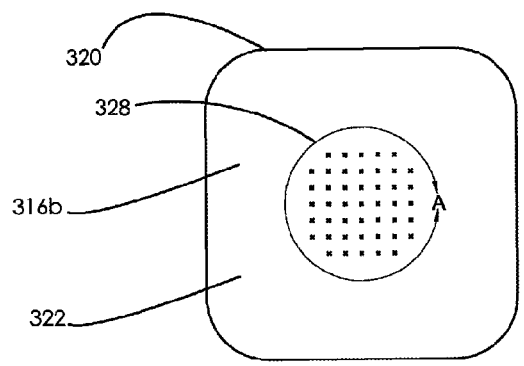 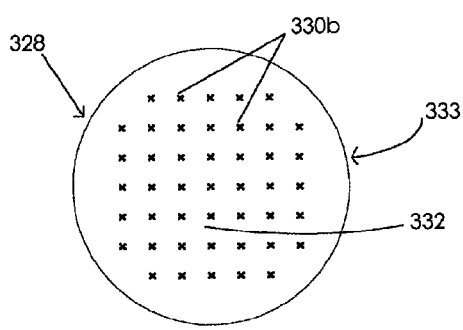
FIG. 8  FIG. 8A

OIL-LESS AND WETTED PRESSURE RELIEF VALVES HAVING AN INTEGRATED FILTER

RELATED APPLICATION

This patent application is a continuation-in-part of co-pending U.S. patent application Ser. No. 13/199,486 filed Aug. 31, 2011. The entire content of U.S. patent application Ser. No. 13/199,486 is incorporated herein by reference.

BACKGROUND OF THE INVENTION

1. Field of the Invention

This invention relates generally to one-way pressure relief valves that are applied to packaging for products, such as coffee, and more particularly to improved pressure relief valves that have an integrated filter and which may be used with or without a wetting agent.

2. Background Art

U.S. Pat. No. 7,178,555 (Engel et al.) discloses a one-way pressure relief valve attachable to product packaging to vent pressurized gases from the packaging. In addition, one-way pressure relief valves, such as the PLITEK PLI-VALV PV-28 pressure relief valves, are applied to packaging for products, such as coffee, to allow unwanted gases to vent from the packaging while sealing out atmospheric gases. Such valves may vary in material and construction depending on the packaging application. The valves may be made, for example, of plastic or foil, and are generally self-adhering, thin, low profile designs supplied on a nontearing polyester or paper liner.

The valves are generally attached to the product package with a heat-sealed or pressure-sensitive adhesive. An adhesive on the back side of the valves may initially mount the valves on the liner. The valves are removed from the liner and the adhesive is used to attach a valve to the package.

In operation, the valves open at a target pressure and then close at a lower target pressure, the values of which are dependent on the packaging application, after pressure inside the packaging drops. The valves vent unwanted gases and seal out atmospheric gases from rigid or flexible packaging or other enclosures. One advantage of such valves is that they allow a product, such as coffee, to be packaged immediately after roasting and grinding to preserve product freshness. Such one-way pressure relief valves allow a product, such as coffee, to degas during packaging and shipping, while reducing oxidation of the product. Use of such valves permits elimination of a bulk degassing process of the product prior to packaging. This not only speeds the overall process, saving time and money, and space, but also reduces exposure of the product to oxidation. Thus the product, such as coffee, is provided to consumers at a greater level of freshness and quality.

A sealing lubricant (also known as a wetting agent) such as a silicone or graphite impregnated oil may be added between the membrane layers of the valve to wet the relevant valve surfaces to facilitate closing of the valve. Addition of a sealing lubricant to wet the relevant valve surfaces is typically done just prior to applying the valve to the packaging. In operation, the dry strap membrane of such prior art valves is permitted to flex away from an opening to vent unwanted gases within the packaging upon reaching the application-determined opening pressure. When the pressure drops to the application-determined closing pressure, the dry strap in cooperation with the sealing lubricant wetting the dry strap, flexes back toward the opening closing the valve and preventing atmospheric gases from entering the packaging.

One-way pressure relief valves including a wetting agent are excellent for their intended purpose. However, the step of lubricating the valves with a wetting agent adds time and cost and is another factor to control in the process of applying the valves. While the wetted valve is often attached to the outside of the packaging, there may be instances in which it is desirable to put the valve inside the package with the product and inclusion of a wetting agent may not be possible because the wetting agent could come into contact with the product. Accordingly, there is a need for a one-way pressure relief valve that does not require the addition of a lubricant.

There also remains a need affecting one-way pressure relief valves generally which is to protect the pressure relief valves from becoming fouled by fine particulate matter, such as particulates within the packaging to which a valve is attached. Fouling of the one-way pressure relief valve can interfere with operation of the valve and can prevent the valve from closing completely. Incomplete valve closure can allow air to enter the package damaging the product within the package. Accordingly, there is a need for a one-way pressure relief valve that prevents valve fouling and contributes to improved operation of the one-way pressure relief valve.

SUMMARY OF THE INVENTION

Certain embodiments of the present invention are concerned with providing a one-way pressure relief valve for application to product packaging without requiring the addition of a sealing lubricant to wet sealing portions of the pressure relief valve. Other one-way pressure relief valve embodiments may include such a sealing and wetting lubricant for optimal operation. A filter integrated with the pressure relief valve prevents particulates from entering the pressure relief valve providing for improved valve operation.

In embodiments, a one-way pressure relief valve may include a gas-impervious base layer having a top, a bottom, and an opening extending through the base layer from top to bottom. A flexible seal cooperates with the base layer to open and close the pressure relief valve. A flexible seal may include a gas-impervious adhesive-like material layer atop the base layer and around the base layer opening. Further, a gas-impervious silicone or other release film coated membrane covers the base layer opening with the release film in contact with the adhesive-like material creating a surface attraction between the release film and the adhesive-like material to close the pressure relief valve. When pressure inside the package exceeds a target pressure, the adhesive-like material layer and release film coated membrane separate allowing gas to flow therebetween and out of the pressure relief valve through a gas flow path.

The release film coated membrane covering the opening extending through the base layer may not extend to the edges of the adhesive-like material layer in one direction, and it may not extend to the edges of the base layer in one direction.

A gas-impervious adhesive layer having a thickness located on the bottom of the base may be provided to attach the base to the packaging. The adhesive layer preferably has an opening, generally aligned with the opening extending through the base layer, extending entirely through the adhesive layer.

A flexible seal may further include a gas-impervious cover layer and a gas-impervious adhesive layer between the cover layer and the silicone or other release film coated membrane, opposite the silicone or other release film.

The one-way pressure relief valve may also have a gas-impervious intermediate layer having a top and bottom between the adhesive-like material layer and the base with an opening extending through the intermediate layer from top to bottom and generally aligned with the opening in the base and the opening in the adhesive-like material layer. The one-way pressure relief valve may further have a filter material layer between the openings of the intermediate layer and the base, a gas-impervious layer of adhesive between the intermediate layer and the filter material layer, and an opening extending through the layer of adhesive between the intermediate layer and the filter material layer. The opening may be generally aligned with the openings of the adhesive-like material layer, the intermediate layer, and the base.

The opening in the base may be larger than the openings in the intermediate layer and the layer of adhesive between the intermediate layer and the filter material layer. The filter material layer may be secured around its periphery by a portion of the layer of adhesive between the intermediate layer and the filter material layer, and the filter material layer maybe recessed in the opening in the base.

A plurality of openings of a size to prevent the passage of the product into the openings of the intermediate layer and the base may be included in the filter material layer.

A gas-impervious layer of adhesive may be included between the filter material layer and the base with an opening extending through the layer of adhesive between the filter material layer and the base. The opening may be generally aligned with the openings of the adhesive-like material layer, the intermediate layer, the layer of adhesive between the intermediate layer and the filter material layer, and the base.

The filter material layer may include a plurality of openings of a size to prevent the passage of the product into the opening of the intermediate layer toward the sealing and operating portions of the valve in the area of the generally aligned openings extending through the adhesive-like material layer, the intermediate layer, and the layer of adhesive between the intermediate layer and the filter material layer.

The filter material layer may prevent the passage of liquid while permitting the escape of gas, and may be an expanded polytetrafluoroethylene material, a liquid proof breathable fabric, a hydrophobic material, or an oleophobic material.

In another embodiment, the present invention is concerned with a further pressure relief valve for application to product packaging. Such embodiment has a gas-impervious base layer having a top and bottom and an opening extending through the base layer from top to bottom. A gas-impervious layer is provided atop the base layer around the opening extending through the base layer. A gas-impervious intermediate layer is provided having a top and bottom between the layer atop the base layer and the base and an opening extending through the intermediate layer from top to bottom and generally aligned with the opening in the base and the opening in the layer atop the base layer. A filter material layer is provided between the intermediate layer and base aligned with the openings in the intermediate layer and base. The filter material layer is secured between the intermediate layer and base by gas-impervious adhesive.

The opening in the base may be larger than the openings in the intermediate layer and the layer of adhesive between the intermediate layer and the filter material layer; the filter material layer may be secured around its periphery by a portion of the layer of adhesive between the intermediate layer and the filter material layer; and the filter material layer may recessed in the opening in the base.

A plurality of openings of a size to prevent the passage of the product into the openings of the intermediate layer and sealing and operating portions of the valve may be included in the filter material layer.

A gas-impervious layer of adhesive may be included between the filter material layer and the base with an opening extending through the layer of adhesive between the filter material layer and the base, and generally aligned with the openings of the layer atop the base, the intermediate layer, the layer of adhesive between the intermediate layer and the filter material layer, and the base.

The filter material layer may include a plurality of openings of a size to prevent the passage of the product into the openings of the intermediate layer and into the sealing and operating portions of the valve.

The filter material layer may prevent the passage of liquid while permitting the escape of gas.

In other embodiments, a one-way pressure relief valve having a particulate filter is provided. The pressure relief valve is for attachment over a vent on an exterior surface of a closed package. Preferably, the pressure relief valve comprises a filter layer and a flexible seal joined selectively to the filter layer. A preferred filter layer has a periphery and first and second sides defining a body therebetween. The filter layer preferably has a filter element providing passage of gas through the body while obstructing passage of particulate matter therethrough. A preferred flexible seal forms a gas flow path between the flexible seal and the filter layer first side along an unjoined region of the flexible seal and filter layer from the filter element to the filter layer periphery. The flexible seal has a first position in which the unjoined region seals the filter element to obstruct gas flow through the body of the filter layer and a further position in which the unjoined region is spaced at least partially from the filter element by gas pressure exerted through the filter element to permit one-way gas outflow through the gas flow path. In the embodiment, a pressure relief valve enables one-way pressurized gas outflow from an interior of the closed package through the filter element and the gas flow path while preventing particulate matter from interfering with sealing of the filter element once gas pressure inside the package is decreased.

A preferred filter element defines aperture and barrier portions, the aperture portions providing for the passage of the gas through the filter layer body and the barrier portions providing for the obstructing of the particulate matter. The apertures defined by the filter element may have a shape or shapes of any suitable type including shapes selected from the group consisting of circles, slits, chevrons, rectangles, and combinations thereof. The apertures defined by the filter element may be arranged in one or more cluster. Preferably, the filter element has a mesh size of between about 30 mesh and 200 mesh.

Embodiments may be configured for operation without a wetting fluid. In such embodiments, a first gas-impervious layer having a surface attraction may be provided atop the filter layer permitting gas flow through the aperture portions. A flexible cover is preferably over the filter layer. A second gas-impervious layer supported by the flexible cover covers the aperture portions in the first position. Preferably, the second gas-impervious layer has a surface affinity attracted to the first gas-impervious layer to form a seal therewith blocking passage of gas between the first and second gas-impervious layers. In the embodiments, movement of the flexible seal to the further position separates the first and second gas-impervious layers to allow gas to flow along the gas flow path between the first and second gas-impervious layers.

Other embodiments may be configured for optimal operation with a wetting fluid on the valve surface. In such embodiments, the flexible seal used in conjunction with the filter layer preferably comprises a closure unjoined to the filter element and overlying the aperture portions. A cover layer has a second side which holds the closure against the filter element when in the first position. The preferred cover layer has first and second shoulder or outer regions spaced laterally apart and facing the first side of the filter layer. The shoulder regions are joined to the filter layer with the closure and the gas flow path therebetween. Movement of the cover layer to the further position by gas pressure separates the closure from the aperture portions to permit gas to flow out of the pressure relief valve along the gas flow path.

Other features and embodiments are described in the drawings and detailed description which follows.

BRIEF DESCRIPTION OF THE DRAWINGS

Exemplary pressure relief valves having an integrated particulate filter may be understood by reference to the following description taken in conjunction with the accompanying drawings, in which like reference numerals identify like elements throughout the different views. For convenience and brevity, like reference numbers are used for like parts amongst the embodiments. The drawings are not necessarily to scale, emphasis instead being placed upon illustrating the principles of the invention. In the accompanying drawings:

FIG. 6 illustrates the exemplary filter layer of the pressure relief valve of FIG. 5;

FIG. 6A is an enlarged view of an exemplary filter element taken along section 6A of FIG. 6;

FIG. 7 illustrates a further exemplary filter layer;

FIG. 7A is an enlarged view of an exemplary filter element taken along section 7A of FIG. 7;

FIG. 8 illustrates yet another exemplary filter layer;

FIG. 8A is an enlarged view of an exemplary filter element taken along section 8A of FIG. 8;

DETAILED DESCRIPTION

Figure 1:
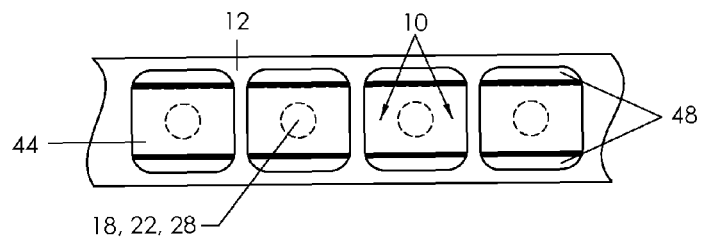
FIG. 1 is a top plan, reduced scale view, of a fragment of a liner carrying a series of four exemplary pressure relief valves of the present invention.

As illustrated in FIGS. 1-14, the present invention relates to an improved one-way pressure relief valve 10, 110, 210, 310, and 410 for application to a product package 11 (FIG. 9) in which gases need to be vented from package 11 and atmospheric gases need to be prevented from entering back into the package 11 through pressure relief valve 10, 110, 210, 310, and 410. For convenience and brevity, exemplary pressure relief valves 10, 110, 210, 310, and 410 are described for use with an exemplary package 11 of the type illustrated in FIG. 9, it being understood that such pressure relief valves 10, 110, 210, 310, and 410 may be used with any suitable package such as those described herein.

Certain of exemplary pressure relief valves 10, 110, 210, and 310 illustrated in FIGS. 1-5 do not require a lubricant to wet and seal the valve. Exemplary pressure relief valve 410 illustrated in FIGS. 9-14 is designed for optimal function when certain valve surfaces are wetted with a lubricant or other wetting agent.

Certain of exemplary pressure relief valves 110, 210, 310, and 410 include an integrated filter. As used herein, "integrated filter" means or refers to a filter which is a component part of pressure relief valve 110, 210, 310, and 410.

Exemplary pressure relief valves 10, 110, 210, 310, and 410 provide for one-way pressurized gas flow out from a closed container, or package 11, to the surrounding environment. A "closed" package 11 means or refers to anything that contains, or can contain, a material 13 (FIGS. 11-12) and which is closed. Closure of package 11 can result from the manufacturing or packaging process or from when the package 11 is re-closed following removal of material 13 from package 11. For example, a package 11 containing coffee beans or ground coffee may be re-closed subsequent to removal of a portion of the beans or coffee grounds from within package 11.

Figure 9:
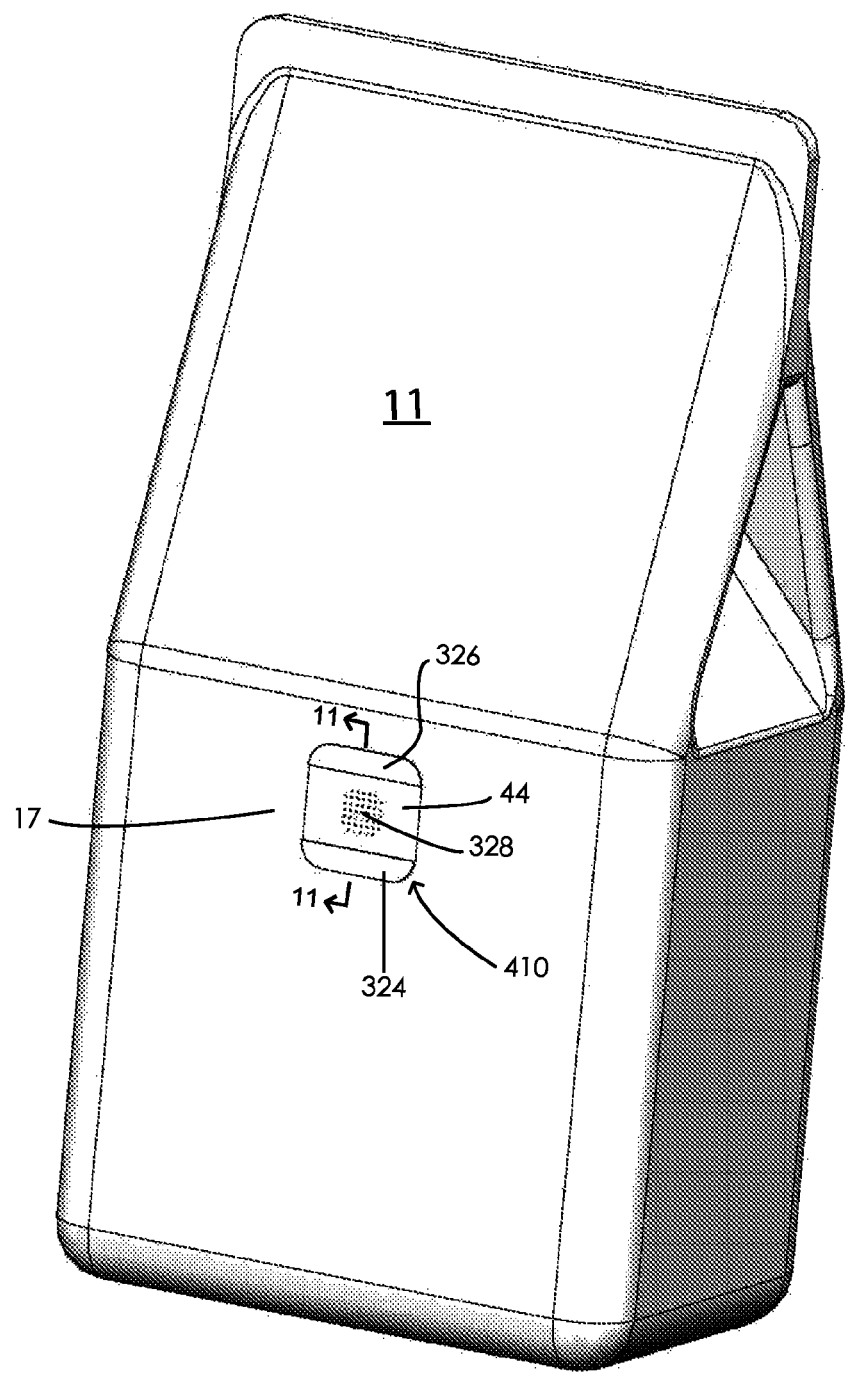
FIG. 9 is an exemplary package including a pressure relief valve having an integrated filter secured to an exterior surface of the package.
Figure 11:
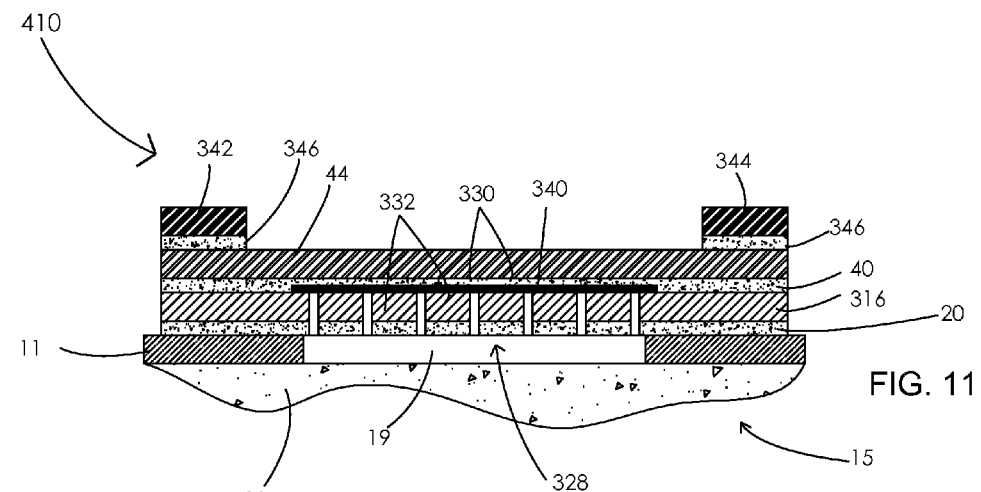
FIG. 11 is a section view of the pressure relief valve taken along section 11-11 of FIG. 9 showing the valve in a closed state.
Figure 12:
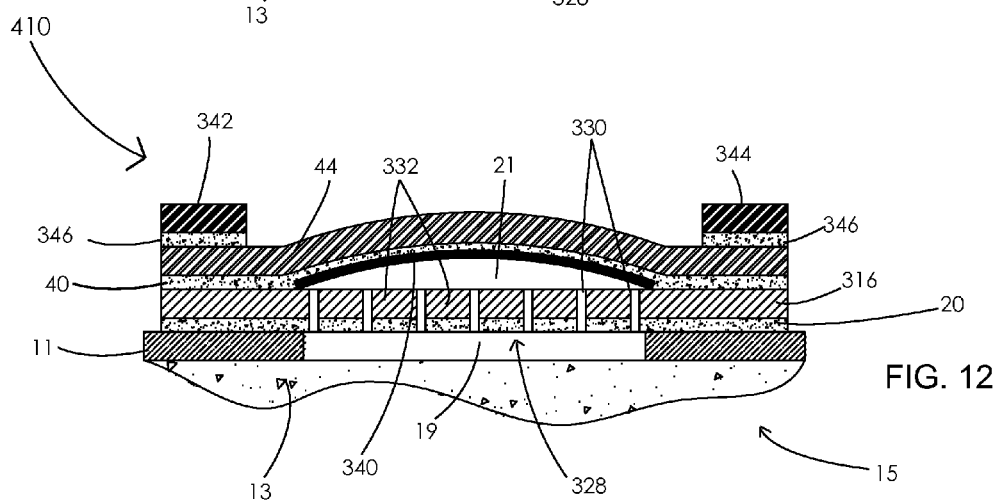
FIG. 12 is a section view of the pressure relief valve taken along section 11-11 of FIG. 9, but showing the valve in an open state.

The gas to be evacuated from package 11 is contained within an interior portion 15 of package 11 illustrated in FIGS. 9 and 11-12. The gas can be generated internal to package 11 after packaging and closure of package 11 by, for example, off gassing by coffee, organic, or other type material 13 within the closed package 11. By way of further example, the entrapped gas may be gas remaining in a package following the packaging process. For example, a sack-type or a bag-type package of grout or fertilizer (not shown) could contain gas in a head space following packaging and such gas could enlarge the volumetric size of the package making the package less compact and requiring more space for storage of the package. A pressure relief valve 10, 110, 210, 310, 410 may be used to evacuate the gas to reduce the volumetric size of the package.

Integrated particulate filters of the types described herein ensure that pressure relief valves 110, 210, 310, and 410 operate properly by preventing small particulate-type material 13 from interfering with closure of pressure relief valves 110, 210, 310, and 410 after pressurized gas is evacuated from package 11. Incomplete closure of pressure relief valves 110, 210, 310, and 410 can permit unwanted atmospheric air to enter package 11, potentially spoiling or damaging material 13 contained within package 11.

Pressure relief valves 10, 110, 210, 310, and 410 may be used with any type of package wherein it is desired to evacuate gas from such package and package 11 illustrated in FIG. 9 is merely one example of a package which may be used with pressure relief valves 10, 110, 210, 310, and 410. Representative examples of packages 11 include flexible and rigid cans, packs, bags, and pouches, all of which are known to persons of skill in the art.

Pressure relief valves 110, 210, 310, and 410 are preferably affixed to an exterior surface 17 of package 11 over a vent 19 through package 11 which permits passage of gas out of package 11 to the surrounding environment. Pressure relief valves 110, 210, 310, and 410 may be affixed to any suitable exterior surface 17 of package 11 having a vent 19 including, for example, a top, a bottom, a front, a rear, a side, a lid, a cover, and a cap of package 11. Pressure relief valves 110, 210, and 310 not including a wetting agent or lubricant may be used on an interior surface of package 11.

Referring now to FIG. 1, an exemplary series of four pressure relief valves 10 embodying the present invention is shown in FIG. 1 mounted on a fragment of a liner 12 for removal and attachment to a package, such as package 11 of FIG. 9. Liner 12 carries pressure relief valves 10 until the valves 10 are removed during the process of attaching the valves to packaging as in U.S. Pat. No. 7,472,524 (Hoffman et al.). However, valves 10 illustrated in FIG. 1 do not require the step of injecting a lubricant, such as by application of a vacuum to separate layers of the valve 10 to provide for dispersal of a lubricant sprayed, or preferably atomized, into openings in the valve 10. The valves 10 may be sized as appropriate based on the packaging application. As illustrated in FIG. 1, the valves 10 are conveniently spaced apart at regular intervals along liner 12, as for example, at a one inch interval between centers, although the repeat spacing is also dependent on the packaging application.

For use in packaging of a product such as coffee, an opening pressure less than 0.4 psig and a closing pressure greater than 0.008 psig may be desirable for the valves. Put another way, valve 10 may be designed to open when the pressure inside package 11 exceeds pressure external to package 11 by less than about 0.4 psig and valve 10 may be designed to close when pressure inside package 11 exceeds pressure outside package 11 by 0.008 psig or less.

Figure 2:
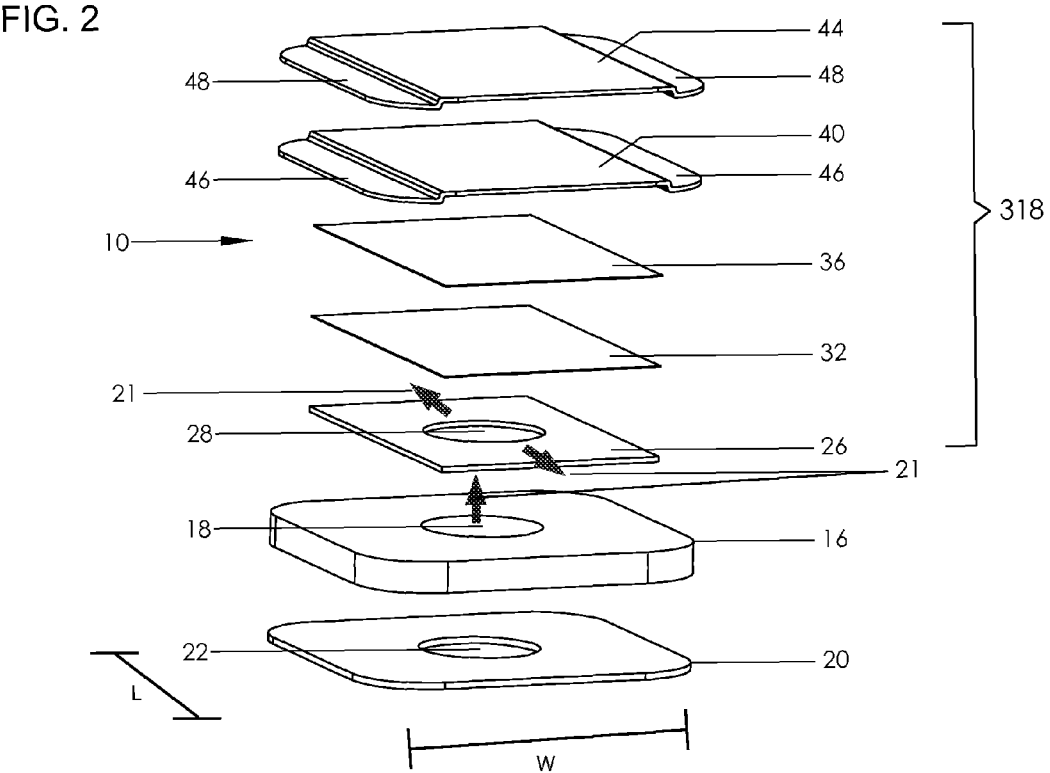
FIG. 2 is an exploded perspective view of an embodiment of a pressure relief valve embodying the present invention.

As illustrated in the exploded perspective view of FIG. 2, pressure relief valve 10, has a gas-impervious bottom layer or base membrane 16 of polyethylene terephthalate (PET), or other suitable plastic, approximately 0.25 mils to 50 mils in thickness. The overall material selection and construction of the valve 10 is dependent not only on the product being packaged, but also on the nature of the packaging itself, particularly its flexibility or rigidity. The material, and particularly the thickness, of base 16 are determined by those skilled in the art to overcome the bending force of the packaging. A hole or opening 18, which is best shown in FIG. 2, is generally centrally disposed within the perimeter of base 16 and extends entirely through base 16.

To mount base 16 on liner 12 for later removal from the liner and attachment to packaging, an adhesive 20 of approximately 0.25 mils to 15 mils in thickness is applied. Adhesive layer 20, which is also gas-impervious, is also provided with a hole or opening 22 conveniently aligned with opening 18 in base 16. Suitable adhesives for adhesive layer 20 may include pressure-sensitive and heat-activated adhesives. Rubber-based, silicone, and acrylic adhesives may be utilized in adhesive layer 20.

A corresponding hole or opening through liner 12 is not needed for the valves 10 (and pressure relief valves 110, 210, 310, and 410) of the present invention, but may result from the manufacturing process for valve 10.

Cooperating with base 16 to close and, alternatively, open valve 10 is flexible seal 318. Flexible seal 318 includes layer 26, membrane 36 with layer 32, adhesive layer 40, and cover 44. Flexible seal 318, except layer 26, flexes responsive to an increase in differential gas pressure to permit gas to flow out from valve 10 and flexes back to its original position to close valve 10 when the differential pressure decreases.

Referring then to FIG. 2, positioned atop base 16, around opening 18, is a gas-impervious layer 26 of an adhesive-like material, generally referred to as no tack, ultra low tack, cling film, self wetting, removable adhesive, or cohesive substrate of approximately 0.25 mils to 15 mils thickness. As illustrated in FIG. 2, a hole or opening 28 extending through the adhesive-like material layer 26 is also conveniently generally aligned with openings 18 and 22. A gas-impervious silicone or other dry release film layer 32 coats a PET, or other plastic, gas-impervious membrane 36, approximately 0.25 mils to 15 mils in thickness. An example of a silicone material which may be implemented as a release film layer 32 is polydimethysiloxane. The membrane 36 including release film layer 32 covers openings 28, 22, and 18, with release film layer 32 in contact with adhesive-like material layer 26 creating a surface attraction between film layer 32 and adhesive-like material layer 26. By way of example only, the affinity of release film layer 32 and adhesive-like material layer 26 may be described in quantitative terms as a bond strength in the range of 0.25 grams/inch to 10 grams/inch when measured with a tensile tester in accordance with ASTM F-88. As is best illustrated in FIG. 2, each of the layers 26, 32, and 36, extends generally the length (L) of valve 10, but is narrower than the width (W) of valve 10.

Over the top of membrane 36 and the side edges of the top surface of base 16 is a gas-impervious pressure sensitive adhesive layer 40 which is approximately 0.25 mils to 15 mils thick. A gas-impervious PET, or other plastic, top or cover membrane 44, approximately 0.25 mils to 15 mils thick, covers the pressure sensitive adhesive layer 40. The adhesive of layer 40 conveniently has more adhesive strength than adhesive 20 so that the force of adhesion between pressure relief valve 10 and liner 12 will be less than the force of adhesion between the parts or layers of the pressure relief valve 10 and so that a pressure relief valve 10 may be removed from liner 12 without causing valve 10 to separate. Suitable adhesives for adhesive layer 40 may include pressure-sensitive and heat-activated adhesives. Rubber-based, silicone, and acrylic adhesives may be utilized in adhesive layer 40.

As illustrated in FIG. 2, while all of the components 26, 32, 36, 40, and 44 are generally coextensive in one direction, they are not in the transverse direction. More particularly, adhesive-like material layer 26, release film layer 32, and membrane 36 are not as wide in the transverse direction as base 16, pressure sensitive adhesive layer 40, and cover membrane 44, and do not extend to the edges of base 16, pressure sensitive adhesive layer 40, and cover membrane 44. This results in what appears in FIG. 2, to be lowered shoulders 46 and 48 along the edges of adhesive layer 40, and cover membrane 44, respectively. Shoulders 48 prevent any sideways leakage, particularly of air into package 11, which would be detrimental to the proper functioning of valve 10. To prevent any flexing away below adhesive-like material layer 26, which could allow air into the packaging, materials of a thickness and flexibility appropriate to fit package 11 are used for base 16 and adhesive layer 20.

Adhesive-like material layer 26 and release film layer 32 may be of the same size, that is have the same outside dimensions as illustrated in FIG. 2. However, in a further embodiment, release film layer 32 could be reduced in sized to result in a lower target opening pressure and a more rapid closure of valve 10 by making release layer 32 narrower than layer of adhesive-like material 26. Such sizing would reduce the surface area of adhesive-like material layer 26 and release film layer 32 in contact thereby reducing the energy required to separate the adhesive-like material and release film layers 26, 32 thereby opening valve 10 at a lower pressure.

Openings 18, 22, and 28 are illustrated in this embodiment as circular. However, openings 18, 22 and 28 may have a different configuration, such as an oval configuration. The geometry of openings 18, 22 and 28, especially opening 18 in base 16, has a direct correlation to opening pressure. The larger the perimeter of the opening 18, 22 and 28, the lower the opening pressure can be.

In operation, base 16 and flexible seal 318 operate in the following manner. Release film 32 coated membrane 36 is separated from adhesive-like material layer 26 by the build up of the target opening pressure inside a package, such as package 11, to permit venting of the unwanted gases into the atmosphere. This pressure build up represents a differential pressure between pressure inside package 11 and the atmosphere outside such package 11. Membrane 36, pressure sensitive adhesive layer 40, and cover membrane 44 of flexible seal 318 all flex upwardly together under the force of the target opening pressure to allow gas to escape from package 11. The upward flexing movement is generally parallel, and not transverse, to shoulders 46 and 48. Gas flows out of valve 10 along gas flow pathway 21 bounded by base layer 16 opening 18, release coated membrane 36 adhered to cover membrane 44 by adhesive 40, base layer 16 and shoulders 48 of membrane 44 adhered to base 16 by adhesive 40. When such differential pressure is decreased, force applied by cover membrane 44 to release coated membrane 36 causes membrane 36 to be seated on adhesive-like material layer 26 closing pressure relief valve 10.

After the gases are vented, and the pressure inside package 11 drops down to the target closing pressure, the attraction of the release film layer 32 to the ultra low tack adhesive-like material layer 26 reseals the valve 10 to provide one-way functionality and prevent the entry of oxygen and other atmospheric gases through valve 10 and into the package 11.

Figure 3:
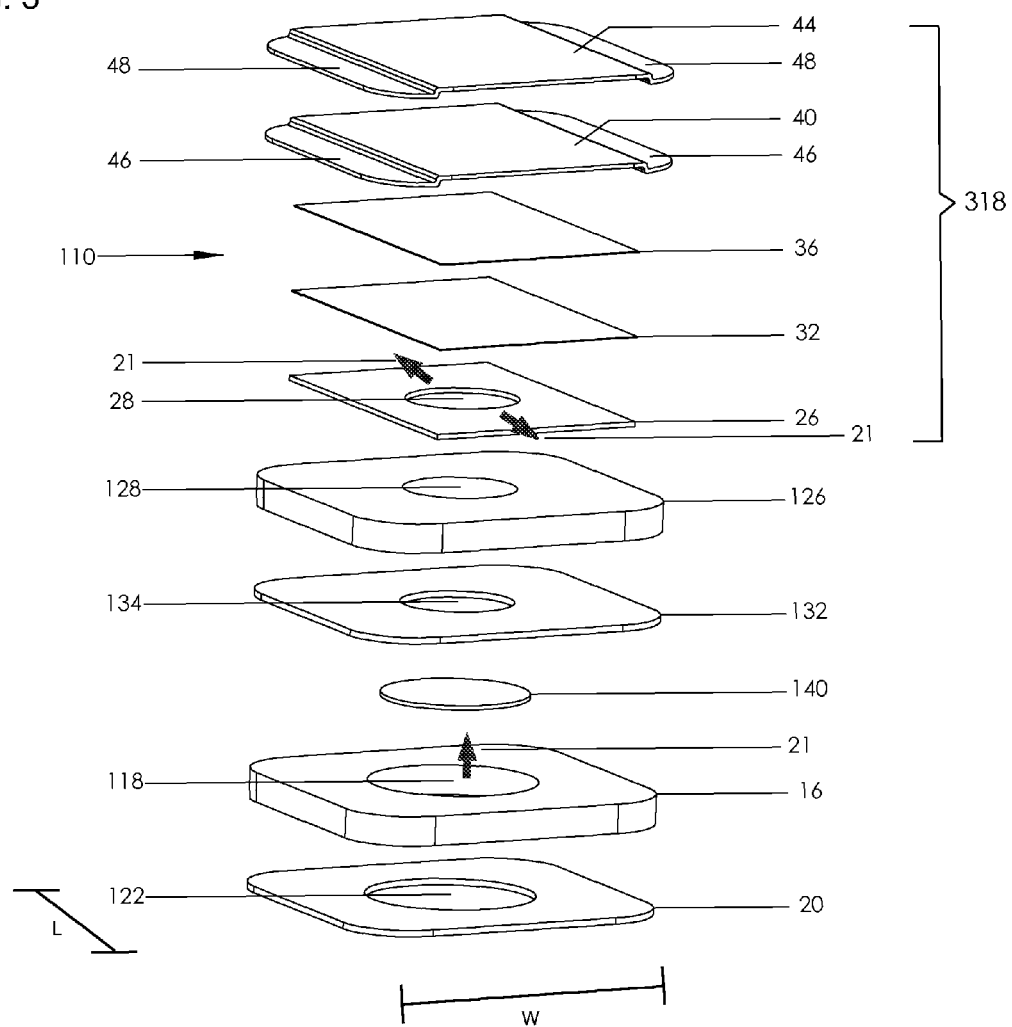
FIG. 3 is an exploded perspective view of a further embodiment of a pressure relief valve, but including an integrated filter in accordance with the present invention.

Referring next to FIG. 3, there is shown a filtered pressure relief valve 110 embodiment of the present invention. That is, pressure relief valve 110 has an integrated filter 140. Filtered pressure relief valve 110 may also be mounted on a liner 12 as illustrated in FIG. 1 for valve 10 for removal and attachment to a product package 11. Portions of valve 110 that are the same as valve 10 are identified by the same reference numerals.

Accordingly, as illustrated in the exploded perspective view of FIG. 3, pressure relief valve 110, has a bottom layer or base membrane 16 to which adhesive 20 is applied to mount base 16 on liner 12 for later removal from the liner 12 and attachment to a package, such as package 11. A hole or opening 118, as illustrated in FIG. 3, is circular and generally centrally disposed within the perimeter of base 16. Opening 118 extends entirely through base 16. Adhesive layer 20 is also provided with a circular hole or opening 122 conveniently aligned with opening 118 in base 16. Both openings 118 and 122 are larger in diameter than openings 18 and 22 of valve 10.

Valve 110 has a gas-impervious intermediate layer or membrane 126, similar to base membrane 16, which may also be of PET or other suitable plastic, approximately 0.25 mils to 50 mils in thickness. A hole or opening 128, as illustrated in FIG. 3, is generally centrally disposed within the perimeter of intermediate membrane 126 and extends entirely through intermediate membrane 126.

To affix intermediate membrane 126 to base membrane 16, a layer of adhesive 132 of approximately 0.25 to 15 mils in thickness is applied. Adhesive layer 132 is also provided with a hole or opening 134. Both openings 128 and 134, illustrated as circular openings in FIG. 3, are conveniently generally aligned with each other and conveniently generally concentric with opening 118 in base 16 and opening 122 in adhesive layer 20. The diameter of openings is smaller than the diameter of openings 118 and 122.

A generally circular filter membrane 140 is mounted between base 16 and adhesive layer 132. Filter 140 has a diameter larger than the diameter of openings 128 and 134, but smaller than the diameter of openings 118 and 122. Accordingly, filter 140 is secured around its periphery by the underside of adhesive layer 132 beneath intermediate membrane 126, and is recessed in opening 118 of base 16.

Filter membrane 140 may be made of a filter material appropriate for the packaging application in regards to gas flow and the restriction of particulates. For example, for some coffee products, a 10 gsm filter material may be used. The filter material may be a synthetic fabric, more particularly a woven nylon material. One example of a suitable material is Cerex nylon woven material made by Cerex Advanced Fabrics LP, of Cantonment, Fla., which is a particularly durable and tough material. This material has a high resistance to chemical attack, and is resistant to insect and bacterial attack and is resistant to mildew. Such filter material of filter membrane 140 prevents the entrance of fine particulate matter, such as finely ground coffee, from further entering the pressure relief valve 110 and disrupting proper functioning of pressure relief valve 110.

Cooperating with intermediate membrane 126 to close and, alternatively, open valve 110 is flexible seal 318. Flexible seal 318 includes layer 26, membrane 36 with layer 32, adhesive layer 40 and cover 44. As with valve 10, flexible seal 318, except layer 26, flexes responsive to an increase in differential gas pressure to permit gas to flow out from valve 110 and flexes back to its original position to close valve 110 when the differential pressure decreases.

Referring then to FIG. 3, positioned atop intermediate membrane 126 and around opening 128 is a layer 26 of an adhesive-like material. As illustrated in FIG. 3, hole or opening 28 extending through the adhesive-like material layer 26 is also circular of the same general diameter as openings 128 and 134, and conveniently generally aligned with openings 128 and 134. On top of the layer of adhesive-like material layer 26 is release film layer 32 coating on membrane 36. Membrane 36 may be of PET, or other plastic, and may have a thickness of approximately 0.25 mils to 15 mils as described in connection with pressure relief valve 10. The release coated membrane 36 covers openings 28, 128, 134, 118, and 122, with release film layer 32 in contact with adhesive-like material layer 26 due to a surface attraction between release film layer 32 and adhesive-like material 26. There should not be any sideways leakage, particularly of air into the packaging. None of the layers below adhesive-like material layer 26 should flex away to allow air into package 11; this is achieved by selection of appropriate materials and thicknesses of each of the layers to fit the packaging application.

As with valve 10, and as illustrated in FIG. 3, each of layers 26, 32 and 36, extends generally the length (L) of valve 110, but is narrower than the width (W) of valve 110, and the release coated membrane 36 and adhesive-like material layer 26 are preferably narrower than intermediate layer 126 as illustrated in FIG. 3. Over the top of membrane 36 and the side edges of the top surface of intermediate membrane 126 is a pressure sensitive adhesive layer 40, with shoulders 46, which secures PET, or other plastic, cover membrane 44, with shoulders 48, covering pressure sensitive adhesive layer 40. Cover membrane 44 may have a thickness of approximately 0.25 mils to 15 mils as described for pressure relief valve 10.

Openings 28, 118, 122, 128, and 134 are described and illustrated in this embodiment as circular. However, they may have a different configuration, such as an oval configuration.

Valve 110 operates in the same manner as valve 10, with the additional function of blocking the passage of small particles of product, such as ground coffee, into the valve 110 past base 16. As with valve 10, an increase in differential pressure within package 11 causes flexible seal 318 to move separating membrane 36 from adhesive-like layer 26 on intermediate membrane 126. Separation of membrane 36 from adhesive-like layer 26 opens valve 110 allowing gas to flow through gas flow path 21 in the direction of the indicating arrows and out of valve 110.

Obstruction of particulates by filter membrane 140 prevents such particulates from becoming lodged between membrane 36 and adhesive-like layer 26 on intermediate membrane 126. Lodgment of particulates could potentially prevent complete surface-to-surface seating of membrane 36 on adhesive-like layer 26 leaving passageways between membrane 36 and adhesive-like layer 26 through which air could enter package 11 through pressure relief valve 110.

Figure 4:
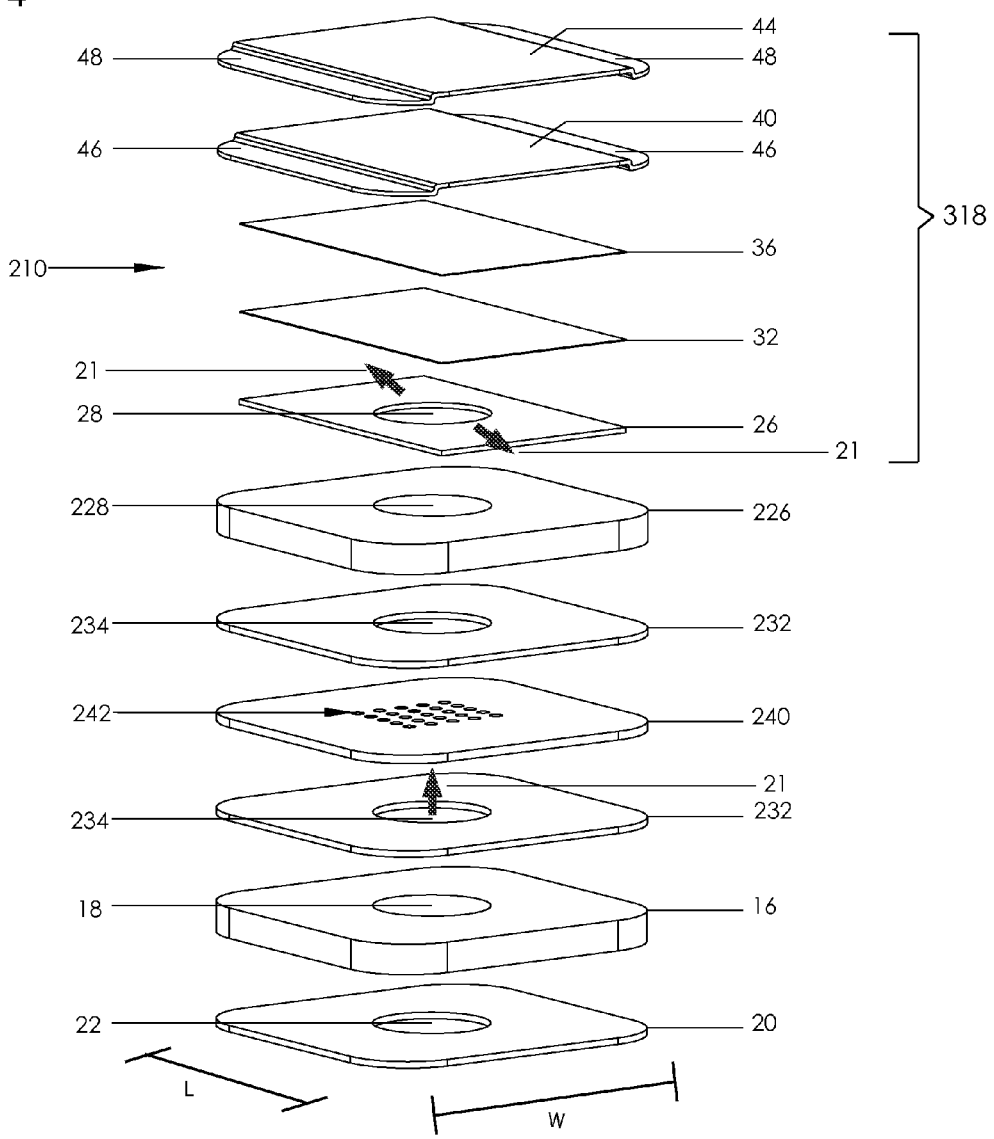
FIG. 4 is an exploded perspective view of another embodiment of a pressure relief valve embodying the present invention with a membrane in between the base layer and a lower base layer that prevents particulate, or in another variation liquid, from entering or penetrating the valve seal layer.

Referring next to FIG. 4, an additional embodiment of the present invention is illustrated. A pressure relief valve 210 of this embodiment may also be mounted on a liner 12 for removal and attachment to product package 11 as illustrated in FIG. 1 for valve 10. Portions of valve 210 that are the same as valve 10 are identified by the same reference numerals.

Accordingly, as illustrated in the exploded perspective view of FIG. 4, pressure relief valve 210, has a bottom layer or base membrane 16 with a hole or opening 18 generally centrally disposed within the perimeter of base 16 and extending through the thickness of base 16. To mount base 16 on liner 12 for later removal from the liner and attachment to packaging, an adhesive 20 is applied. Adhesive layer 20 is also provided with a hole or opening 22 conveniently aligned with opening 18 in base 16.

Valve 210 has a gas-impervious intermediate layer or membrane 226, similar to base membrane 16, which may, as an example, also be of PET or other suitable plastic, approximately 0.25 mils to 50 mils in thickness. A hole or opening 228, as illustrated in FIG. 3, is generally centrally disposed within the perimeter of intermediate membrane 226 and extends entirely through intermediate membrane 226. Between intermediate membrane 226 and base membrane 16 are two spaced apart gas-impervious layers of adhesive 232 of approximately 0.25 mils to 15 mils in thickness. Each adhesive layer 232 is provided with a hole or opening 234. As illustrated in FIG. 4, openings 18, 22, 28, 228 and 234 are circular and conveniently generally aligned with each other.

A filter membrane 240, which may be coextensive with base 16, intermediate membrane 226, and adhesive layers 232, is mounted between base 16 and intermediate membrane 226, more particularly between adhesive layers 232. In one variation, filter 240, may be made of a material such as polyethylene, polyester, or polypropylene, provided with a plurality of laser drilled or punched holes 242, in the area of openings 234, 228, 28, 18 and 22, of a number and size appropriate for the packaging application in regards to gas flow and the restriction of particulates.

In another variation, filter membrane 240 may, without holes 242, be impervious to liquid while allowing the escape of unwanted gases from the packaging. Such a filter material could be an expanded polytetrafluoroethylene (ePTFE), liquid proof breathable fabric, or some other hydrophobic or oleophobic material that prevents the passage of an undesirable liquid out of or into the package 11, and accordingly prevents disrupting proper functioning of pressure relief valve 210.

Cooperating with intermediate membrane 226 to close and, alternatively, open valve 210 is flexible seal 318. Flexible seal 318 of valve 210 includes layer 26, membrane 36 with layer 32, adhesive layer 40, and cover 44. As with valves 10, 110, flexible seal 318, except layer 26, flexes responsive to an increase in differential gas pressure to permit gas to flow out from valve 210 and flexes back to its original position to close valve 210 when the differential pressure decreases.

Positioned atop intermediate membrane 226, around opening 228, is layer 26 of adhesive-like material with hole or opening 28 extending through adhesive-like material layer 26 as described in connection with pressure relief valves 10 and 110. On top of the layer of adhesive-like material layer 26 is a membrane 36 with a release film layer 32 as described in connection with pressure relief valves 10 and 110. Membrane 36 may be made of PET or other plastic material. An example of a silicone material which may be implemented as a release film layer 32 is polydimethysiloxane. The release coated membrane 36 covers openings 28, 228, 234, 18, and 22 by virtue of the surface attraction between release film layer 32 and adhesive-like material layer 26. As in valve 10 and as illustrated in FIG. 4, each of layers 26, 32 and 36, extends generally along the length (L) of valve 110, but is narrower than the width (W) of valve 210, and the release coated membrane 36 and adhesive-like material layer 26 are preferably narrower than intermediate layer 226.

Over the top of release coated membrane 36 and the side edges of the top surface of intermediate membrane 226 is a pressure sensitive adhesive layer 40 which secures PET, or other plastic, cover membrane 44, with shoulders 48, covering pressure sensitive adhesive layer 40. Openings 18, 22, 28, 228, and 234 are described and illustrated in this embodiment as circular. However, they may have a different configuration, such as an oval configuration.

Pressure relief valve 210 is similar in operation to pressure relief valve 10, with the additional function of blocking the passage of particulates or liquid, depending on the material of filter membrane 240. As with valve 10 and valve 110, an increase in differential pressure within package 11 causes flexible seal 318 to move separating membrane 36 from adhesive-like layer 26 on intermediate membrane 226. Separation of membrane 36 from adhesive-like layer 26 opens valve 210 allowing gas to flow through gas flow path 21 in the direction of the indicating arrows and out of valve 210. Pressure relief valve 210 is also similar in operation to pressure relief valve 110, particularly with respect to obstruction of particulates by filter membrane 240.

Figure 5:
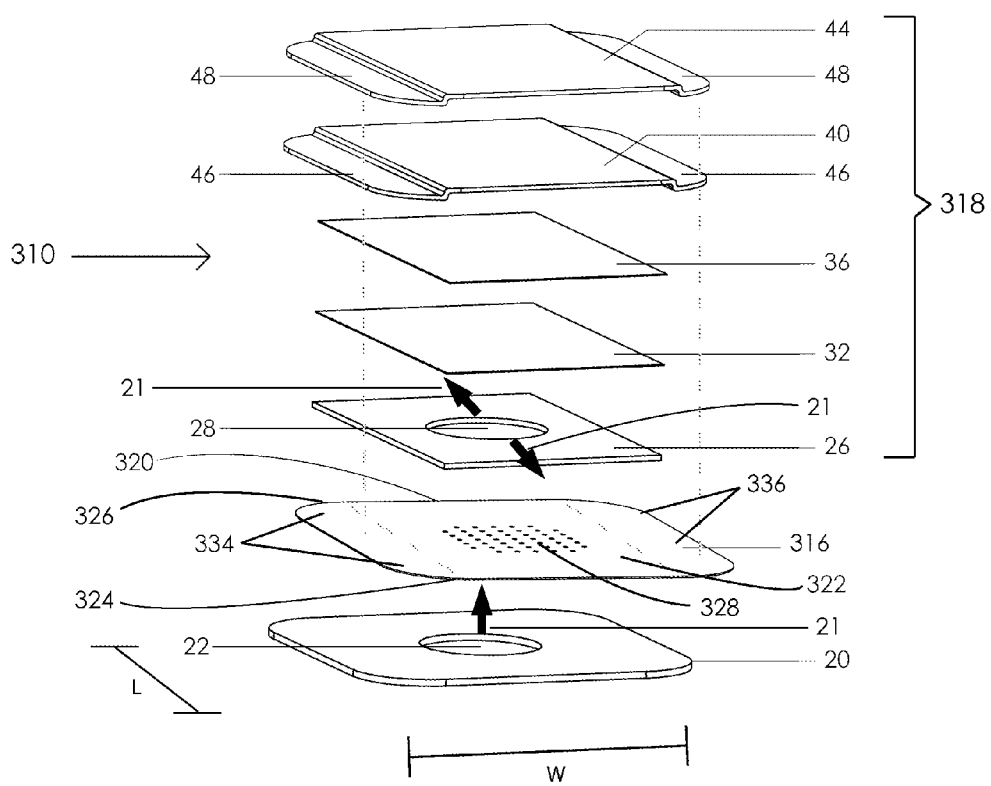
FIG. 5 is an exploded perspective view of a further embodiment of a pressure relief valve having an integrated filter.

Reference will now be made to FIGS. 5-14 which show further embodiments of one-way pressure relief valves having an integrated filter 310, 410. Pressure relief valve 310 illustrated in FIG. 5 is an oil-less valve which does not require use of a wetting agent, such as a silicone or graphite impregnated oil, to facilitate complete closure of pressure relief valve 310. Pressure relief valve 410 illustrated in FIGS. 9-14 preferably utilizes a wetting agent to wet the relevant valve surfaces to facilitate full closure of pressure relief valve 410.

As discussed in more detail below, pressure relief valves 310, 410 are implemented such that the integrated filter both: (1) provides a supporting base and package-attachment point for pressure relief valve 310, 410; and (2) provides part of the valve structure regulating one-way gas flow through pressure relief valves 310, 410. An important advantage of such structure is that pressure relief valves 310, 410 can be made more compact and can be provided with a lower profile than valves not including the novel configuration. This is of great importance in packaging applications which demand that the pressure relief valves 310, 410 be inconspicuous and not detract from, or interfere with, the design elements of the package 11. Moreover, pressure relief valve embodiments 310, 410 illustrate that the principles described herein can be applied to both oil-less and wetted valves providing the manufacturer with a range of product options to better meet the needs of the customer.

Pressure relief valves 310, 410 share many of the same components with pressure relief valves 10, 110, and 210. For simplicity and brevity, like reference numbers are used to identify like components throughout the figures and in the text description of the different embodiments.

Referring again to FIG. 5, the oil-less pressure relief valve 310 illustrated therein includes an integrated particulate filter component comprising a base filter layer 316 in combination with a flexible seal 318. Together, base filter layer 316 and flexible seal 318 regulate one-way gas flow through pressure relief valve 310. Filter layer 316 is a type of base layer because, in this embodiment, filter layer 316 provides a platform on which pressure relief valve 310 is constructed and is attached directly to package 11.

Referring further to FIG. 5, filter layer 316 includes a periphery 320, a first side 322, and a second side 324. Relative to parts comprising pressure relief valve 310, first side 322 can be considered an inner side while second side 324 can be considered an outer side. First and second sides 322, 324 define a body 326 between sides 322, 324. In the example, filter layer 316 is generally flat, or planar, and may be made of a strip-type material. Representative materials suitable for use in manufacture of filter layer 316 can include polyethylene, polypropylene, PET, or other suitable plastic material. Filter layer 316 preferably has a thickness in the range of about 0.25 mils to 50 mils depending on the application.

In certain "green" applications in which environmentally-friendly materials are required, it may be desirable for pressure relief valve 310 to be constructed of biodegradable materials, that is materials which will decompose when in a landfill. Where biodegradability is desired, filter layer 316 and other components (e.g., cover membrane 44 and membrane 36) of pressure relief valve 310 may be made of polylactic acid, cellulose acetate, or other compostable materials.

Referring to FIGS. 5, 6, and 6A, exemplary filter layer 316 includes a filter element 328. Filter element 328 provides passage of gas through body 326. While filter element 328 permits gas to pass through body 326, it also obstructs small particulate matter within package 11 from passing through body 326. Exemplary filter layer 316 defines aperture 330 and barrier 332 portions. In the example, barrier portions 332 are all parts of filter layer 316 which are not aperture portions 330. Barrier portions 332 are preferably continuous, gas-impermeable portions of filter layer 316 second side 324 which serve as a barrier to movement of any substance through body 326.

Referring to FIGS. 6 and 6A, aperture portions 330 of filter layer 316 are preferably openings entirely through filter layer 316 body 326 which provide for the passage of gas completely through body 326. Aperture portions 330 preferably consist of plural small openings. To avoid obscuring the drawings, just several of such small openings are indicated by reference number 330 in FIG. 6A. Aperture portions 330 may comprise a plurality of laser drilled or punched holes of a number and size appropriate for the packaging application given requirements for gas flow and particulate filtering. In the embodiment, filter element 328 acts as a type of "sieve" which selectively permits gas movement through body 326, yet blocks passage of small particulate matter, keeping that particulate matter along second side 324 of filter layer 316 and out of pressure relief valve 310.

Preferably, aperture portions 330 of filter element have a mesh size of between about 30 to about 200 mesh. As is known, a 30 mesh size will block particles having a particle size greater than about 595 μm while a 200 mesh size will block particles having a particle size greater than about 74 μm. As illustrated in FIGS. 5, 6, and 6A, aperture portions 330 may be of a generally round shape when viewed directly above or below such as in these figures. By way of example only, round-type apertures 330 that could be used in a pressure relief valve 310 suitable for use on a ground coffee package 11 could have a diameter of about 0.010 inch, or approximately No. 50 mesh. As is also known, No. 50 mesh will block particles greater than about 297 μm, which is a size typical of small particulate matter found in a ground coffee package 11.

As illustrated in FIGS. 7, 7A, 8, and 8A, many variations of filter layer 316 are envisioned within the scope of the invention. For example, aperture portions 330 defined by filter element 316 could include small openings having a shape when viewed directly above or below (i.e., a plan view) consisting of chevrons 330a in filter element embodiment 316a (FIGS. 7-7A), or x-shaped slits 330b in filter element embodiment 316b (FIGS. 8-8A). Aperture portions 330 could have other shapes such as rectangles. Combinations of all of these aperture portion 330 shapes could be utilized.

As illustrated in FIGS. 5-8A, aperture portions 330, 330a, 330b defined by filter element 328 may be grouped and arranged in one or more cluster 333. Organization of aperture portions 330 into a cluster 333 is useful to position aperture portions 330 over vent 19 to maximize volumetric gas flow out through vent 19 and pressure relief valve 310 to the environment. Cluster 333 may have a width dimension (W) and a length dimension (L) in the width and length dimensions illustrated in FIGS. 5 and 10. In the examples of FIGS. 5-8A, cluster 333 width dimension (W) is approximately the same as the cluster length dimension (L) which provides a compact path for gas flow through filter layer 316.

The sizing of aperture portions 330 and/or the amount and location of clusters 333 can be modified to increase or decrease gas flow through pressure relief valve 310 as desired for a given application.

In a further embodiment, filter layer 316 could be a liquid-impervious membrane. Such a filter layer 316 embodiment could be impervious to liquid while allowing passage of gas therethrough. Aperture portions 330 might, or might not, be present in such a filter layer 316. Material used to construct such a liquid-impervious filter layer 316 could include those described above in connection with filter layer 240 of pressure relief valve 240 (FIG. 4).

Referring again to FIG. 5, adhesive layer 20 is provided on filter layer 316 second side 324 to both removably mount filter layer 316 on release liner 12 and to permanently attach filter layer 316 and pressure relief valve 310 to a package 11. In the example, adhesive layer 20 may be approximately 0.25 mils to 15 mils in thickness. Adhesive layer 20 should be impervious to gas flow to prevent gas leakage between filter layer 316 and exterior surface 17 of package 11. Suitable adhesives for adhesive layer 20 may include pressure-sensitive and heat-activated adhesives. Rubber-based, silicone, and acrylic adhesives may be utilized in adhesive layer 20.

Referring further to FIG. 5, adhesive layer 20 is provided with an opening 22 to space adhesive layer 20 from aperture portions 330 of filter element 328. Spacing of adhesive layer 20 from aperture portions 330 can prevent obstruction of aperture portions 330 which may be desirable in some applications.

In other embodiments such as described below in connection with FIG. 10, adhesive layer 20 could be deposited entirely across filter layer 316 second side 324 and aperture portions 330 could be formed simultaneously with apertures 22a in adhesive layer 20. In such an embodiment, laser drilling or punching of many aperture portions 330 in filter layer 316 would simultaneously form many corresponding apertures 22a through adhesive layer 20 aligned with aperture portions 330 as illustrated for pressure relief valve 410 in FIG. 10. Gas would pass through apertures 22a and aperture portions 330 as such gas flows through pressure relief valve 310. Such an adhesive layer 20 with apertures 22a proximate aperture portions 330 could serve to trap particulates adhered to the adhesive layer 20 preventing such particulates from reaching filter element 328.

Referring again to FIG. 5, as with pressure relief valves 10, 110, and 210, the components comprising flexible seal 318 provide a type of "gate" or "closure" enabling pressure relief valves 10, 110, 210, and 310 to be placed in a closed state and, alternatively, in an open state. In the closed state, flexible seal 318 is in a first position and pressure relief valves 10, 110, 210, and 310 are sealed blocking entry of air into pressure relief valve 10, 110, 210, and 310 and package 11. In the open state, flexible seal 318 is in a further position in which pressure relief valves 10, 110, 210, and 310 permit one-way gas flow from package 11, through pressure relief valve 10, 110, 210, and 310 along gas flow path 21 and out to the environment. FIGS. 11-14 illustrate the closed (FIG. 11) and open (FIGS. 12-14) states of pressure relief valve 410 which are generally representative of the operation of exemplary pressure relief valves 10, 110, 210, and 310.

As with pressure relief valves 10, 110, and 210, pressure relief valve 310 opens and closes based on pressure differential between pressure inside package 11 and pressure outside package 11. Pressure relief valve 310 may be designed to open with any desired target pressure differential. By way of example only, pressure relief valve may be designed to have target opening pressure when the pressure inside package 11 exceeds pressure external to package 11 by less than about 0.4 psig. Pressure relief valve 310 may be designed to close when pressure inside package 11 exceeds pressure outside package 11 by 0.008 psig or less. Other target opening and closing pressures may be utilized and the foregoing are merely non-restrictive examples.

As illustrated in FIG. 5, flexible seal 318 comprises adhesive-like material layer 26, membrane 36 with release film layer 32 applied thereto, cover membrane 44 and an adhesive layer 40 joining flexible cover membrane 44, or layer, to membrane 36 and selectively joining cover membrane 44 shoulders 48 (i.e., outer regions of cover membrane 44 in the example) to attachment regions 334, 336 of filter layer 316. As used herein, "selective joining" means or refers to joining of cover membrane 44 only to attachment regions 334, 336 of filter layer 316 and not to filter layer 316 between attachment regions 334, 336. Because cover membrane 44 is unjoined to filter layer 316 between attachment regions 334, 336, cover membrane 44 is permitted to flex and move away from filter layer 316 (e.g., see FIG. 12) along the unjoined regions when in the open state to permit gas flow out of pressure relief valve. Accordingly, cover membrane 44 of the example is a type of flexible cover membrane 44.

Gas flow pathway 21 indicated by the arrows in FIG. 5 extends through aperture portions 330 and is bounded by release coated membrane 36 (adhered to cover membrane 44 by adhesive 40 in the example), filter layer 316, and shoulders 48 of cover membrane 44 selectively joined to filter membrane 316 by adhesive 40 along attachment regions 334, 336. Gas flow pathway 21 permits gas to move through pressure relief valve 310.

Referring once again to FIG. 5, positioned atop filter layer 316 and across filter element 328, is a gas-impervious layer 26 of an adhesive-like material of the same type described in connection with pressure relief valves 10, 110, and 210. Such adhesive-like material layer 26 is generally referred to as no tack, ultra low tack, cling film, self wetting, removable adhesive, or cohesive substrate.

Adhesive-like material layer 26 preferably has a thickness of approximately 0.25 mils to 15 mils. Adhesive-like material layer 26 may further include an opening 28 extending around filter element 328 and aligned with filter element 328 and aperture openings 330 and opening 22.

In the example, gas-impervious membrane 36, made of PET or other plastic material, is coated with a gas-impervious silicone, or other dry release film layer 32. An 10 example of a silicone material which may be implemented as a release film layer 32 is polydimethysiloxane. Membrane 36 preferably has a thickness of approximately 0.25 mils to 15 mils. Membrane 36 covers opening 28 in adhesive-like material layer 26 and covers filter element 328 with release film layer 32 in contact with adhesive-like material layer 26 creating a surface attraction between film layer 32 and adhesive-like material layer 26 and seating membrane tightly against adhesive-like material layer 26 blocking gas movement through filter element 328. While release film layer 32 and adhesive-like material layer 26 are seated tightly against one another to close pressure relief valve 310, they are not joined because they are separable from one another when differential pressure within package 11 exceeds the target pressure and flexible seal 318, except adhesive-like material layer 26, is moved to the further position to open pressure relief valve 310.

Adhesive-like material layer 26 preferably comprises a material with an affinity for release film layer 32. By way of example only, the affinity of adhesive-like material layer 26 for release film layer 32 can be described in quantitative terms as a bond strength in the range of 0.25 grams/inch to 10 grams/inch when measured with a tensile tester in accordance with ASTM F-88. With the appropriate selection of materials and inherent surface energies of adhesive-like material 26 and release film layer 32, the ability to form seals of controlled bond strength is established. The affinity of adhesive-like material layer 26 for release film layer 32 provides a means for keeping membrane 36 in place against filter element 328, and achieving a gas-tight seal that enables valve 310 to function as a one-way pressure relief valve.

As is illustrated in FIG. 5, each of layers 26, 32 and 36, extends generally across the length (L) of pressure relief valve 310, but is generally narrower than the width (W) of pressure relief valve 310; membrane 36 and adhesive-like material layer 26 are located between shoulders 48 in the example which prevents cover membrane 44 between shoulders 48 from being joined to filter layer 316 by adhesive 40. This, in turn, permits cover membrane 44 to flex to open pressure relief valve 310.

Over membrane 36 and attachment regions 334, 336 of filter layer 316 first side 322 is a gas-impervious pressure sensitive adhesive layer 40 which may be approximately 0.25 mils to 15 mils in thickness. Adhesive layer 40 may be of the same adhesive used for adhesive layer 20.

Cover membrane 44 is selectively joined to attachment regions 334, 336 of filter layer 316 by adhesive layer 40 as previously described. Cover membrane 44 may be selectively joined to filter layer 316 by means other than adhesive layer 40. For example, cover membrane 44 could be selectively joined to filter layer 316 by means of sonic welding. Cover membrane 44 may be of gas-impervious PET or other flexible plastic material. Cover membrane 44 may have a thickness of approximately 0.25 mils to 50 mils.

Adhesive-like material layer 26 and release film layer 32 may have the same length and width dimensions. As with the other valve embodiments, release film layer 32 could be sized to result in a lower target opening pressure and a more rapid closure of valve 10 by making release layer 32 narrower than layer of adhesive-like material 26. Such sizing would reduce the surface area of adhesive-like material layer 26 and release film layer 32 in contact, thereby reducing the energy required to separate the adhesive-like material and release film layers 26, 32 allowing pressure relief valve 310 to open at a lower pressure.

FIG. 5 shows that openings 22 and 28 are circular. However, openings 22 and 28 may have a different configuration, such as an oval configuration. The geometry of openings 22 and 28 has a direct correlation to targeted opening pressure. The larger the area of each opening 22 and 28, the lower the target pressure required to place pressure relief valve 310 in the open state.

In operation, pressure relief valve 310 is initially in a closed state similar to that shown in FIG. 11 for pressure relief valve 410. Release film 32 coated membrane 36 is seated against adhesive-like material layer 26 and is held in place preferably by surface affinity between the materials comprising release film 32 coated membrane 36 and adhesive-like material layer 26. No wetting agent is required to form a complete gas-impervious seal between membrane 36 and adhesive-like material layer 26 because the surface affinity is sufficient to keep pressure relief valve in a closed state. Membrane 36 blocks movement of gas through filter element 328 preventing gas inside package 11 from escaping to the atmosphere and preventing air from entering package 11 preserving the freshness of material 13 inside package 11.

Figure 13:
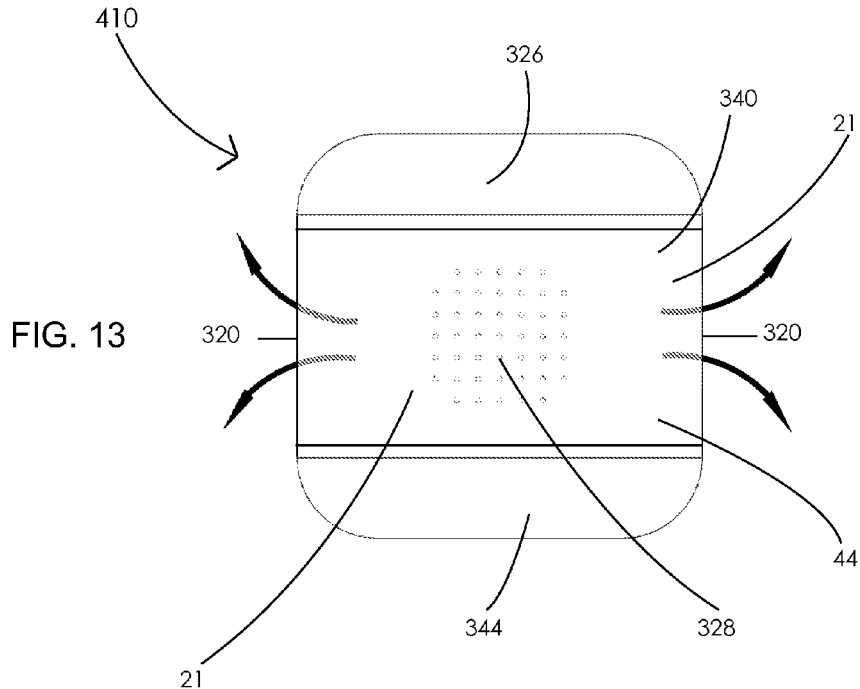
FIG. 13 is a plan view of the pressure relief valve of FIG. 12.
Figure 14:
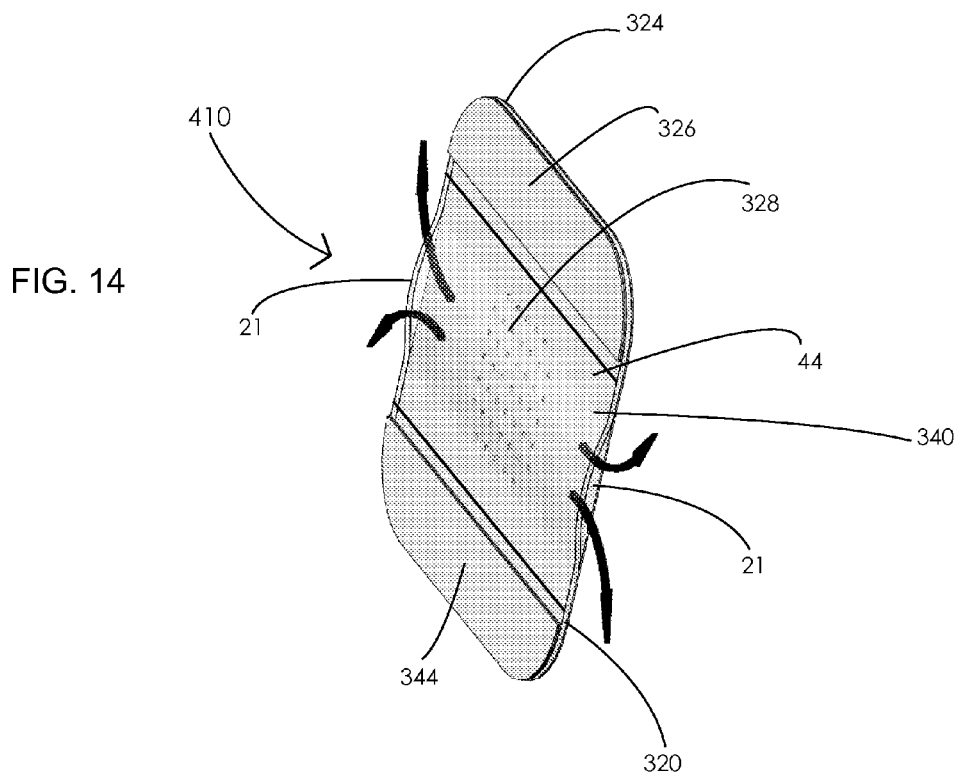
FIG. 14 is a perspective view of the pressure relief valve of FIG. 12.

When pressure inside package 11 exceeds the target pressure required to open pressure relief valve 310, cover membrane 44 and membrane 36 of flexible seal 318 secured to cover membrane 44 by adhesive layer 40 both flex outwardly together under the force of the target opening pressure similar to that illustrated in FIGS. 12-14 for pressure relief valve 410.

Flexure of cover membrane 44 and membrane 36 spaces membrane 36 from adhesive-like material layer 26. Flexure of cover membrane 44 loads cover membrane 44 much as a spring is loaded. Flexure of cover membrane 44 opens gas flow path 21 indicated by the arrows in FIG. 5 thereby allowing gas to escape from package 11 and placing pressure relief valve 310 in the open state.

The pressure differential required to open pressure relief valve 310 may be created by various means including by off gassing of coffee within package 11 or by force applied externally against package 11. For example, packages containing a product such as grout or fertilizer can be pressed by adjacent packages when loaded on a pallet or when stored. If a pressure relief valve 310 were incorporated into the package, the force applied would generate a differential pressure within the package causing gas inside the package to exit pressure relief valve 310 advantageously reducing the volumetric size of the package making it easier and more efficient to store or transport the package.

When the differential pressure is decreased below the target pressure, cover membrane 44 of flexible seal 318 applies a force as it is unloaded and returns to its original position. The force causes membrane 36 to be re-seated on adhesive-like material 26 closing filter element 328 and returning pressure relief valve 310 to the closed state. The process of opening pressure relief valve 310 is repeated when differential pressure inside package 11 again exceeds the target opening pressure.

Operation of pressure relief valve 310 is enhanced by integrated filter layer 316. Filter layer 316 and filter element 328 advantageously block small particulate matter within package 11 from entering pressure relief valve 310 and becoming lodged between membrane 36 and adhesive-like material layer 26. Any such lodgment of particulate matter could create unwanted passageways between membrane 36 and adhesive-like material layer 26 which could allow air to enter package 11 through pressure relief valve 310. Filter element 328, therefore, ensures complete closure of pressure relief valve 310 when in the closed state preventing infiltration of air into package 11 potentially spoiling the contents of package 11.

Integration of filter element 328 with filter layer 316 and exemplary selective joinder of cover membrane 44 to filter layer 316 provides an opportunity to construct a more compact and low profile pressure relief valve 310. A more compact and low profile pressure relief valve provides opportunities for the pressure relief valve 310 to be more inconspicuous when affixed to package 11. This is particularly important when affixing pressure relief valve to an exterior surface 17 of package 11.

Referring now to FIGS. 9-14, pressure relief valve 410 illustrated therein preferably utilizes a wetting agent 338 to wet surfaces of filter layer 316 and flexible seal 318 to facilitate full closure of pressure relief valve 410. As with pressure relief valve 310, pressure relief valve 410 advantageously can be constructed to be compact and to have an extremely low profile. These advantages are possible because, in the example, integrated filter layer 316 provides for both attachment to a package 11 and provides support for pressure relief valve 410, thereby eliminating any requirement that pressure relief valve 410 include additional layers of material.

Figure 10:
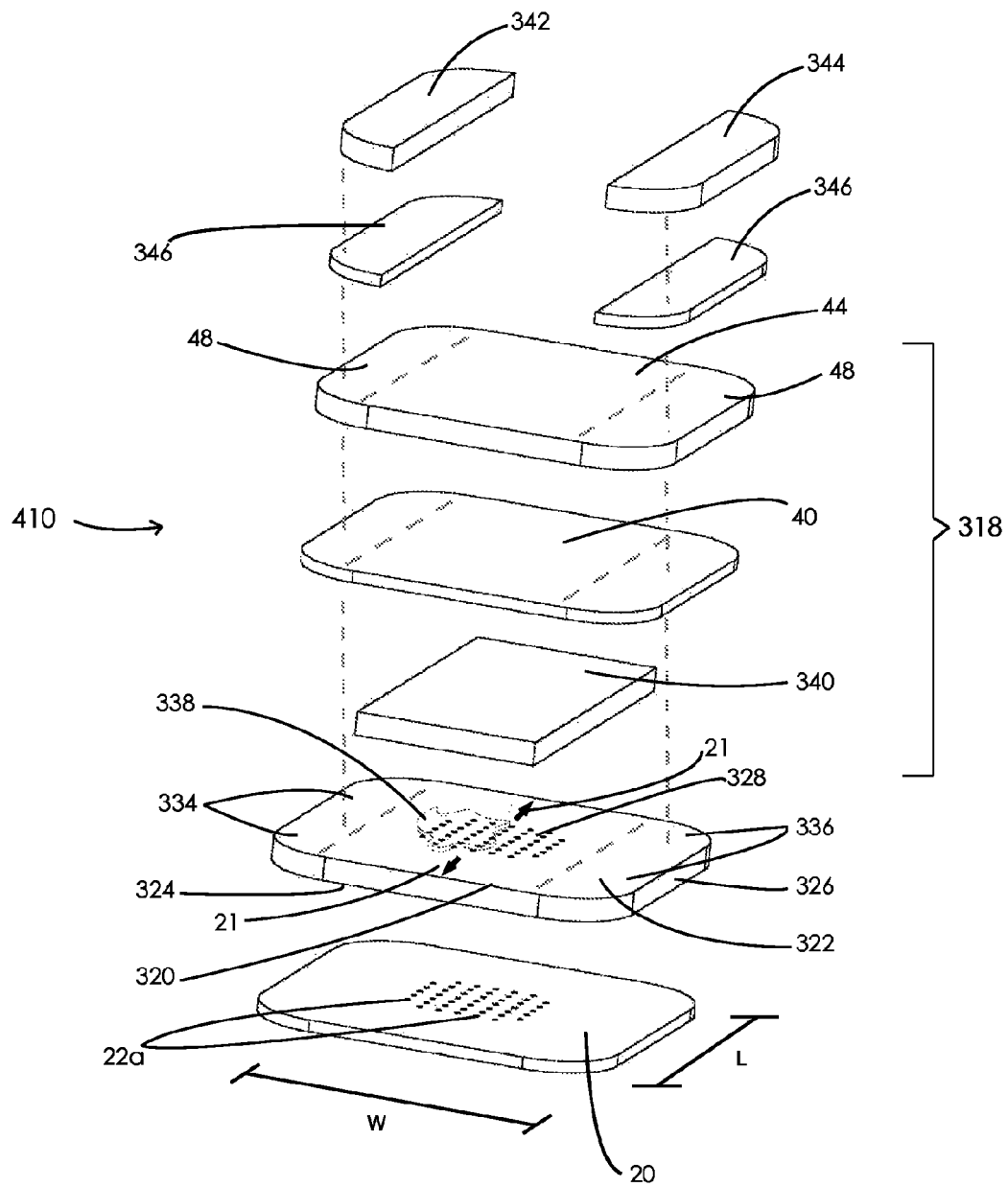
FIG. 10 is an exploded perspective view of the pressure relief valve of FIG. 9.

Referring to FIGS. 10-12, pressure relief valve 410 illustrated therein includes a base filter layer 316 in combination with a flexible seal 318. As with pressure relief valve 310 (and valves 10, 110, and 210), filter layer 316 and flexible seal 318 regulate one-way gas flow through pressure relief valve 410. Filter layer 316 provides a platform on which pressure relief valve 310 is constructed and is attached directly to package 11 by adhesive layer 20.

Referring further to FIGS. 10-12, filter layer 316 includes a periphery 320, first and second sides 322, 324 and a body 326 between sides 322, 324. Filter layer 316 is generally flat, or planar, and may be made of polyethylene, polypropylene, PET, biodegradable polylactic acid and cellulose acetate, or any other suitable material or materials. Filter layer 316 preferably has a thickness in the range of about 0.25 mils to 50 mils depending on the application.

Exemplary filter layer 316 includes a filter element 328 with aperture and barrier portions 330, 332 to provide passage of gas entirely through body 326 through aperture portions 330 while barrier portions 332 obstruct small particulate matter and other objects within package 11 from passing through body 326 and interfering with pressure relief valve 410 operation as described in connection with pressure relief valve 310 and the description of filter layer 316 of pressure relief valve 310 is incorporated herein by reference with respect to pressure relief valve 410. Barrier portions 332 are preferably continuous, gas-impermeable portions of filter layer 316 second side 324 which serve as a barrier to movement of any substance through body 326.

Aperture portions 330 of filter element 328 preferably consist of plural small openings which may be formed in filter layer 316 by laser drilling, punching, or any suitable method and may be sized and arranged based on gas flow and particulate filtering requirements. As with pressure relief valve 310, filter element 328 acts like a type of "sieve" which can have a mesh size of between about 30 to about 200 mesh. Aperture portions 330 may have the same shapes and sizes and may be arranged in one or more cluster 333 as described in connection with pressure relief valve 310 and as illustrated in FIGS. 6, 6A, 7, 7A, 8, and 8A and the description of such aperture portions 330 and clusters 333 is incorporated herein by reference with respect to pressure relief valve 410. The sizing of aperture portions 330 and/or the amount and location of clusters 333 can be modified to increase or decrease gas flow through pressure relief valve 410 as desired for a given application.

Also as described in connection with pressure relief valve 310, filter layer 316 could be a liquid-impervious membrane impervious to liquid while allowing passage of gas therethrough.

Referring again to FIGS. 10-12, adhesive layer 20 is provided on filter layer 316 second side 324 to removably mount filter layer 316 on release liner 12 and permanently attach filter layer 316 and pressure relief valve 310 to a package 11. In the example, adhesive layer 20 may be approximately 0.25 mils to 15 mils in thickness. Adhesive layer 20 should be impervious to gas flow to prevent gas leakage between filter layer 316 and exterior surface 17 of package 11. Suitable adhesives for adhesive layer 20 may include pressure-sensitive and heat-activated adhesives. Rubber-based, silicone, and acrylic adhesives may be utilized in adhesive layer 20.

Referring further to FIGS. 10-12, adhesive layer 20 could be deposited entirely across filter layer 316 second side 324 and aperture portions 330 could be formed simultaneously with apertures 22a in adhesive layer 20 as aperture portions 330 are formed by laser drilling, punching or by other appropriate means. Such an adhesive layer 20 proximate aperture portions 330 could serve to trap particulates adhered thereto, for example within apertures 22a, preventing such particulates from reaching filter element 328.

Referring now to FIGS. 10-14, the components comprising flexible seal 318 of pressure relief valve 410 provide a type of "gate" or "closure" enabling pressure relief valves 410 to be placed in a closed state and, alternatively, in an open state as described in connection with pressure relief valves 10, 110, 210, and 310. In the closed state, flexible seal 318 is in a first position and pressure relief valve 410 is sealed blocking entry of air into pressure relief valve 410 and package 11. In the open state, flexible seal 318 is in a further position in which pressure relief valve 410 permits one-way gas flow from package 11, through gas flow path 21 and out to the environment. FIGS. 11-14 illustrate the closed (FIG. 11) and open (FIGS. 12-14) states of pressure relief valve 410.

Pressure relief valve 410 opens and closes based on pressure differential between pressure inside package 11 and pressure outside package 11. Pressure relief valve 410 may be designed to open with any desired target pressure differential. An opening target pressure differential may be less than about 0.4 psig greater pressure inside package 11 than outside package 11 while pressure relief valve 410 may be designed to close when pressure inside package 11 exceeds pressure outside package 11 by 0.008 psig or less. As with pressure relief valves 10, 110, 210, and 310, other target opening and closing pressures may be utilized and the foregoing are merely non-restrictive examples.

Referring to the exploded view of FIG. 10, flexible seal 318 has a structure which can be wetted with a wetting fluid 338 to obtain optimal adhesion between strap, or closure 340, and filter layer 316. In the example, flexible seal 318 includes closure 340 (also referred to in industry as a "dry strap" or simply "strap"), flexible cover membrane 44, and an adhesive layer 40 joining cover membrane 44, or layer, to closure 340 and selectively joining cover membrane 44 shoulders 48 (outer regions of cover membrane 44 in the example) to attachment regions 334, 336 of filter layer 316. As previously described, "selective joining" means or refers to joining of cover membrane 44 only to attachment regions 334, 336 of filter layer 316 and not to filter layer 316 between attachment regions 334, 336. Because cover membrane 44 is unjoined to filter layer 316 where closure 340 is secured to cover membrane 44 between attachment regions 334, 336, cover membrane 44 is permitted to flex and move away from filter layer 316 as illustrated in FIGS. 12-14 along the unjoined regions when in the open state to permit gas flow out of pressure relief valve. When the unjoined portion of cover membrane 44 moves away from filter layer 316, closure 340 also moves at least partially away from filter layer 316. Accordingly, cover membrane 44 of the example is a type of flexible cover membrane 44, or layer.

In the examples, gas flow pathway 21 is bounded by closure 340 (adhered to cover membrane 44 by adhesive 40 in the example), filter layer 316, and shoulders 48 of cover membrane 44 selectively joined to filter membrane 316 by adhesive 40 along attachment regions 334, 336. Exemplary gas flow pathway 21 permits gas to move through pressure relief valve 310 as described herein.

As is illustrated in FIG. 10, closure 340 extends generally across the length (L) of pressure relief valve 410, but is generally narrower than the width (W) of pressure relief valve 410; closure 340 is located between shoulders 48 in the example which prevents cover membrane 44 between shoulders 48 from being adhered to filter layer 316 by adhesive 40. This, in turn, permits cover membrane 44 to flex to open pressure relief valve.

Closure 340 is secured to cover membrane 44 by adhesive layer 40. Closure 340 prevents adhesive 40 from contacting filter layer 316 where it is unjoined with cover membrane between attachment regions 334 and 336. Adhesive layer 40 joins cover membrane 44 to filter layer 316 attachment regions 334, 336. Adhesive layer 40 is a gas-impervious pressure sensitive adhesive layer 40 which may be approximately 0.25 mils to 15 mils in thickness. Adhesive layer 40 may be of the same adhesive used for adhesive layer 20.

Cover membrane 44 may be selectively joined to filter layer 316 by means other than adhesive layer 40. For example, cover membrane 44 could be selectively joined to filter layer 316 by means of sonic welding. Cover membrane 44 may be of gas-impervious PET or other flexible plastic material. Cover membrane 44 may have a thickness of approximately 0.25 mils to 50 mils.

Referring to FIGS. 10-14, optional rails 342, 344 may be joined to cover membrane 44 by an adhesive 346. If provided, rails 342, 344 are useful to provide separation between the unjoined portion of cover membrane 44 and any adjacent object so that pressure relief valve 410 can freely move away from filter layer 316 to function properly. Adhesive 346 may be of the same material as adhesives 20 and 40.

In operation, pressure relief valve 410 is initially in a closed state. Closure 340 is seated against filter layer 316 across aperture and barrier portions 330, 332 closing aperture portions 330 and preventing gas flow therethrough preserving the freshness of material 13 inside package 11.

Wetting agent 338 is preferably provided between filter layer 316 and closure 340. Wetting agent 338 may, for example, comprise a silicone or graphite impregnated lubricating oil. Wetting agent 338 may be sprayed, or preferably atomized, into aperture portions 330 during manufacture or during application to package 11. Wetting agent 338 improves surface adhesion between filter layer 316 first side 322 and closure 340 improving formation of a gas-tight seal when pressure relief valve 410 is in the closed state.

Referring to FIGS. 12-14, when pressure inside package 11 exceeds the target pressure required to open pressure relief valve 410, cover membrane 44 and closure 340 secured to cover membrane 44 by adhesive layer 40 both flex outwardly together under the force of the target opening pressure.

Referring further to FIGS. 12-14, flexure of cover membrane 44 and closure 340 spaces membrane closure 340 from filter layer 316 and filter element 328. Flexure of cover membrane 44 loads cover membrane 44 much as a spring is loaded. Flexure of cover membrane 44 opens gas flow path 21 indicated by arrows 21 thereby allowing gas to escape from package 11 and placing pressure relief valve 410 in the open state.

As described in connection with pressure relief valve 310, the pressure differential required to open pressure relief valve 410 may be created by various means including by off gassing of coffee or other material 13 within package 11 or by force applied externally against package 11. Pressure relief valve 410 provides for one-way outflow of gas from package 11 to evacuate such gas or reduce the volumetric size of the package 11 to facilitate storage or transportation of the package.

When the differential pressure is decreased below the target pressure, cover membrane 44 of flexible seal 318 applies a force as it is unloaded and returns to its original position. The force causes closure 340 to be re-seated on filter layer over filter element and aperture and barrier portions 330, 332 returning pressure relief valve 410 to the closed state. The process of opening pressure relief valve 410 is repeated when differential pressure inside package 11 again exceeds the target opening pressure.

As with pressure relief valve 310, and pressure relief valves 110 and 210, operation of pressure relief valve 410 is enhanced by integrated filter layer 316. Filter layer 316 and filter element 328 advantageously block small particulate matter 13 within package 11 from entering pressure relief valve 410 and becoming lodged between filter layer 316 and closure 340. Any such lodgment of particulate matter 13 could create unwanted passageways between filter layer 316 and closure 340 which could allow air to enter package 11 through pressure relief valve 410. Filter element 316, therefore, ensures complete closure of pressure relief valve 410 when in the closed state preventing infiltration of air into package 11 potentially spoiling the contents of package 11.

Integration of filter element 328 with filter layer 316 and exemplary selective joinder of flexible seal 318 to filter layer 316 provides an opportunity to construct a more compact pressure relief valve 410. A more compact pressure relief valve 410 provides opportunities for the pressure relief valve 410 to be more inconspicuous when affixed to package 11 which can be very desirable in many packaging applications.

The drawings show pressure relief valves of particular configurations, and particular materials have been described for purposes of illustration. This invention is not limited to these or any other particular configurations or materials. For example, the pressure relief valve of the present invention may be circular or have other geometric shapes as required by the customer. Pressure relief valves may have parts of metal foil instead of plastic, and may optionally include additional structure such as rails 342, 344 or ribs.

Solely as an example, the present invention has been discussed primarily in the context of coffee packaging although it can be readily used for the packing of other food and non-consumable products. While particular embodiments of the invention have been shown and described, other alternatives, variations, and modifications will occur to those skilled in the art. It is intended in the appended claims to cover all such alternatives, variations, and modifications that come within the true spirit and scope of the present invention.

What is claimed is:

1. A one-way pressure relief valve for application to a package comprising:
   a gas-impervious base layer having a top and a bottom;
   an opening extending entirely through the base layer;
   a first gas-impervious layer having a surface attraction atop the base layer and around the base layer opening;
   a flexible cover over the base layer;
   a second gas-impervious layer supported by the flexible cover across the base layer opening, the second gas-impervious layer having a surface affinity attracted to the first gas-impervious layer to form a seal therewith blocking passage of gas between the first and second gas-impervious layers; and
   an integrated filter between the second gas-impervious layer and the base layer aligned with the base layer opening, the integrated filter permitting gas flow toward the first and second gas-impervious layers while obstructing movement of particulates past the integrated filter,
   whereby, pressure from within the package exerts a force which separates the first and second gas-impervious layers permitting gas outflow from the pressure relief valve therebetween.

2. A one-way pressure relief valve having a particulate filter for attachment over a vent on an exterior surface of a closed package containing a gas-producing product, the pressure relief valve comprising:
   a filter layer of a strip-type material having a periphery and first and second sides defining a body therebetween, the filter layer having a filter element in the strip-type material providing passage of gas through the body and obstruction of particulate matter;
   adhesive on the filter layer second side to adhere the pressure relief valve to the exterior surface of the closed package; and
   a flexible seal joined selectively to the filter layer first side to form a gas flow path between the flexible seal and the filter layer first side along an unjoined region of the flexible seal and filter layer from the filter element to the filter layer periphery, the flexible seal having a first position in which the unjoined region seals the filter element to obstruct gas flow through the body and a further position in which the unjoined region is spaced at least partially from the filter layer first side and the filter element by gas pressure exerted through the filter element to permit one-way gas outflow through the gas flow path,
   whereby, the pressure relief valve enables one-way pressurized gas outflow from an interior of the closed package through the filter element and the gas flow path while preventing particulate matter from interfering with sealing of the filter element once gas pressure inside the package is decreased.

3. The pressure relief valve of claim 2 wherein the filter element defines aperture and barrier portions, the aperture portions providing for the passage of the gas through the body and the barrier portions providing for the obstructing of the particulate matter.

4. The pressure relief valve of claim 3 wherein the apertures defined by the filter element are selected from the group consisting of circles, slits, chevrons, and combinations thereof.

5. The pressure relief valve of claim 3 wherein the apertures defined by the filter element are arranged in a cluster.

6. The pressure relief valve of claim 5 wherein the apertures defined by the filter element are arranged in a cluster and the cluster has a width dimension and a length dimension.

7. The pressure relief valve of claim 3 wherein the cluster width dimension is approximately the same as the cluster length dimension.

8. The pressure relief valve of claim 3 wherein the filter element has a mesh size of between about 30 mesh and 200 mesh.

9. The pressure relief valve of claim 3 further comprising adhesive selectively joining the flexible seal to the filter layer to form the gas flow path.

10. The pressure relief valve of claim 3 wherein the unjoined region of the flexible seal is in sealing abutment with the aperture and barrier portions of the filter element when in the first position.

11. The pressure relief valve of claim 10 further comprising a wetting fluid between the unjoined region of the flexible seal and barrier portions.

12. The pressure relief valve of claim 11 wherein the flexible seal comprises:
a closure unjoined to the filter element and overlying the aperture portions; and
a cover layer having a second side holding the closure against the filter element when in the first position, the cover layer having first and second outer regions spaced laterally apart and facing the first side of the filter layer, the outer regions being joined to the filter layer with the closure and the gas flow path therebetween.

13. The pressure relief valve of claim 3 wherein the unjoined region of the flexible seal comprises:
a first gas-impervious layer having a surface attraction atop the filter layer and around the aperture portions;
a flexible cover over the filter layer; and
a second gas-impervious layer supported by the flexible cover covering the aperture portions of the filter layer in the first position, the second gas-impervious layer having a surface affinity attracted to the first gas-impervious layer to form a seal therewith blocking passage of gas between the first and second gas-impervious layers,
whereby, movement of the flexible seal to the further position separates the first and second gas-impervious layers to allow gas to flow along the gas flow path between the first and second gas-impervious layers.

14. The pressure relief valve of claim 3 wherein the adhesive is applied selectively to the second side and is spaced from the filter element.

15. The pressure relief valve of claim 14 further comprising a release liner to which the adhesive on the second side of the filter layer is removably attached.

16. The pressure relief valve of claim 1 wherein the flexible seal has a first side facing away from the filter element and the pressure relief valve further comprises at least one rail attached to and extending away from the first side.

17. The pressure relief valve of claim 1 wherein the filter element and the flexible seal are biodegradable.

18. The pressure relief valve of claim 17 wherein the filter element and the flexible seal are of a biodegradable material selected from the group consisting of polylactic acid, cellulose acetate, and combinations thereof.

19. The pressure relief valve of claim 1 further comprising a closed package to which the pressure relief valve is attached.

20. A one-way pressure relief valve having a particulate filter for attachment over a vent on an exterior surface of a closed package containing a gas-producing product, the pressure relief valve comprising:
a filter layer of a strip-type material having a periphery and first and second sides defining a body therebetween, the filter layer having a filter element in the strip-type material providing passage of gas through the body and obstruction of particulate matter;
an adhesive on the second side of the filter layer to secure the pressure relief valve to the exterior surface of the closed package;
a closure along the filter layer first side and overlying the filter element; and
a flexible cover layer overlying the closure and joined selectively to the filter layer first side to form a gas flow path between the closure and the filter element first side from the filter element toward the filter layer periphery, the flexible cover being movable between a first position holding the closure against the filter element to seal the filter element and obstruct gas flow through the body and a further position in which the closure is spaced at least partially from the filter layer first side and the filter element by gas pressure exerted through the filter element to permit one-way gas outflow through the gas flow path,
whereby, the pressure relief valve enables one-way pressurized gas outflow from an interior of the closed package through the pressure relief valve while preventing particulate matter from interfering with sealing of the filter element once gas pressure inside the package is decreased.

21. A one-way pressure relief valve for application to a package comprising:
a gas-impervious base layer having first and second sides and an opening entirely through the base layer through which gas enters the pressure relief valve and adhesive on the second side to secure the pressure relief valve to an exterior surface of the package;
a first gas-impervious layer over the base layer and around the base layer opening;
a flexible cover over the base layer;
a second gas-impervious layer supported by the flexible cover across the base layer opening, the first and second gas-impervious layers having an attraction which holds the first and second gas-impervious layers together to form a seal blocking passage of gas from the base layer opening and between the first and second gas-impervious layers; and
a filter layer with a filter element therein, the filter layer being between the base layer and the first gas-impervious layer and the filter element being over and aligned with the base layer opening, the filter element permitting gas flow through the filter layer toward the first and second gas-impervious layers while obstructing movement of particulates past the filter layer,
whereby, pressure from within the package exerts a force which overcomes the attraction and at least partially separates the first and second gas-impervious layers permitting gas flow therebetween and out of the pressure relief valve.

22. The pressure relief valve of claim 21 wherein:
the first gas-impervious layer has a surface attraction; and
The second gas-impervious layer has a surface affinity attracted to the first gas-impervious layer.

23. The pressure relief valve of claim 21 wherein the filter layer has first and second sides and the filter layer second side is secured to the base layer first side.

24. The pressure relief valve of claim 23 further including:
a gas-impervious intermediate layer having first and second sides and an opening entirely through the intermediate layer, the intermediate layer second side being secured to the filter layer first side with the intermediate layer opening being over and in alignment with the base layer opening and the filter element; and
the first gas-impervious layer is secured to the intermediate layer first side.

25. The pressure relief valve of claim 24 wherein the flexible cover and the base, filter, and intermediate layers are each of a strip-type material.

* * * * *